(12) United States Patent
Bassi et al.

(10) Patent No.: US 11,697,534 B2
(45) Date of Patent: *Jul. 11, 2023

(54) CAP FOR A CONTAINER, COMBINATION OF A CAP AND A NECK OF THE CONTAINER AND ITS PRODUCTION METHOD

(71) Applicant: SACMI COOPERATIVA MECCANICI IMOLA SOCIETA' COOPERATIVA, Imola (IT)

(72) Inventors: Vittorio Bassi, Faenza (IT); Alessandro Falzoni, Imola (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 0 days.

This patent is subject to a terminal disclaimer.

(21) Appl. No.: 17/419,139

(22) PCT Filed: Jul. 16, 2020

(86) PCT No.: PCT/IB2020/056686
§ 371 (c)(1),
(2) Date: Jun. 28, 2021

(87) PCT Pub. No.: WO2021/014290
PCT Pub. Date: Jan. 28, 2021

(65) Prior Publication Data
US 2022/0204228 A1   Jun. 30, 2022

(30) Foreign Application Priority Data

Jul. 22, 2019 (IT) .................. 102019000012534
Jul. 22, 2019 (IT) .................. 102019000012585
Mar. 27, 2020 (IT) .................. 102020000006496

(51) Int. Cl.
*B65D 55/16* (2006.01)
*B65D 41/34* (2006.01)
*B29C 37/00* (2006.01)

(52) U.S. Cl.
CPC ......... *B65D 55/16* (2013.01); *B65D 41/3428* (2013.01); *B29C 37/0053* (2013.01)

(58) Field of Classification Search
CPC .... B65D 41/3428; B65D 41/34; B65D 41/02; B65D 41/3447; B65D 1/0246;
(Continued)

(56) References Cited

U.S. PATENT DOCUMENTS 4,394,918 A * 7/1983 Grussen ............. B65D 41/3428
215/253
5,246,125 A    9/1993 Julian
(Continued)

FOREIGN PATENT DOCUMENTS

CN    112996733    6/2021
CN    113015683    6/2021
(Continued)

*Primary Examiner* — Chun Hoi Cheung
*Assistant Examiner* — Brijesh V. Patel
(74) *Attorney, Agent, or Firm* — Pearne & Gordon LLP; J. Gregory Chrisman

(57) ABSTRACT

A cap includes a lateral wall extending about an axis and a transversal wall positioned at one end of the lateral wall, a separation line being provided on the lateral wall to define a retaining ring; a closing element removably engageable with the neck, so as to open or close the container; the separation line extends about an axis and being circumferentially interrupted to leave the retaining ring and the closing element joined; wherein the retaining ring comprises a joining portion, a first connecting band, and a second connecting band; a tab, interposed between the first connecting band and the second connecting band and being protruding, or aligned with respect to it, so that, when the
(Continued)

closing element is in an open condition and the connecting bands keep the closing element connected to the retaining ring, the tab can rest on the neck.

22 Claims, 15 Drawing Sheets

(58) Field of Classification Search
CPC ............ B65D 55/16; B65D 2251/1008; B65D 2251/023; B65D 2401/20; B65D 2401/30; B65D 53/00
USPC ......... 215/235, 252–254, 243, 272; 200/263, 200/268, 288, 832, 847; 220/263, 268, 220/288, 832, 847
See application file for complete search history.

(56) References Cited

U.S. PATENT DOCUMENTS

| | | | |
|---|---|---|---|
| 5,360,126 A | 11/1994 | Snyder et al. | |
| 6,474,491 B1 | 11/2002 | Benoit-Gonin et al. | |
| 7,513,377 B1* | 4/2009 | Culley | B65D 41/3428 215/901 |
| 10,654,625 B2 | 5/2020 | Migas et al. | |
| 10,981,700 B2 | 4/2021 | Migas et al. | |
| 2002/0088813 A1* | 7/2002 | Nyman | B65D 41/48 215/254 |
| 2008/0011704 A1* | 1/2008 | Van Ryn | B65D 55/02 215/254 |
| 2011/0000871 A1* | 1/2011 | Bernard | B65D 55/16 215/235 |
| 2011/0114593 A1 | 5/2011 | Ishii | |
| 2012/0024815 A1 | 2/2012 | Kwon | |
| 2012/0285921 A1 | 11/2012 | Kwon | |
| 2012/0298666 A1* | 11/2012 | Kwon | B29C 45/44 220/268 |
| 2012/0305564 A1* | 12/2012 | Hayashi | B65D 41/3428 220/288 |
| 2016/0288961 A1 | 10/2016 | Maguire | |
| 2020/0017260 A1* | 1/2020 | Migas | B65D 55/16 |
| 2020/0115115 A1 | 4/2020 | Migas et al. | |
| 2020/0207525 A1 | 7/2020 | Sung | |
| 2020/0283201 A1 | 9/2020 | Migas et al. | |
| 2021/0371168 A1 | 12/2021 | Graux | |
| 2022/0002021 A1 | 1/2022 | Krautkramer | |

FOREIGN PATENT DOCUMENTS

| | | |
|---|---|---|
| JP | 2011213372 A | 10/2011 |
| JP | 2012201380 A | 10/2012 |
| JP | 2014031202 A | 2/2014 |
| KR | 100981240 B1 | 3/2010 |
| WO | 2019031779 A1 | 2/2019 |
| WO | 2020050823 A1 | 3/2020 |
| WO | 2020093058 | 5/2020 |
| WO | 2020099200 | 5/2020 |

* cited by examiner

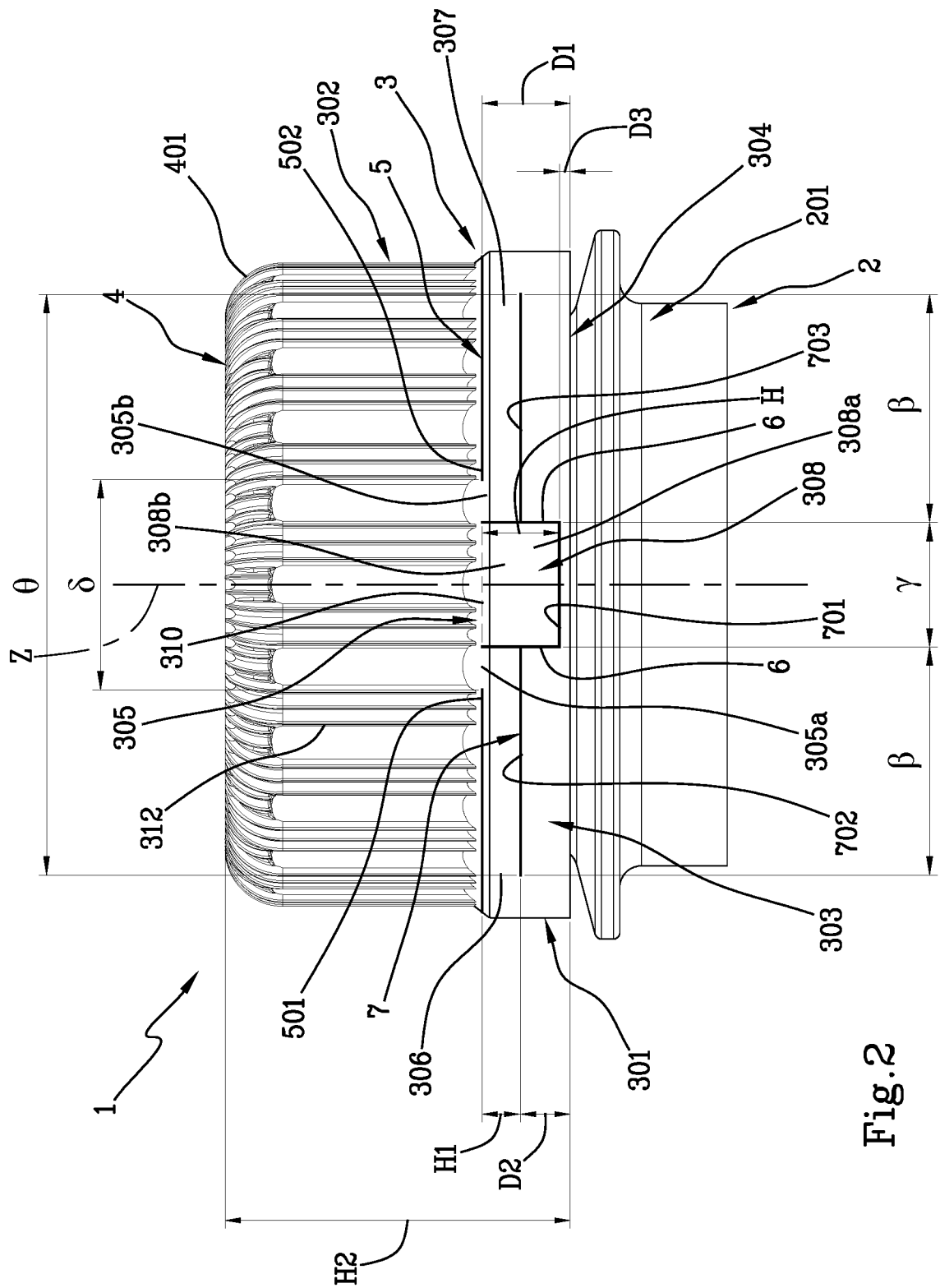

CAP FOR A CONTAINER, COMBINATION OF A CAP AND A NECK OF THE CONTAINER AND ITS PRODUCTION METHOD

This invention relates to a cap for a container, a combination of a closing cap for a container and a neck of the container and a relative method for making the cap for the container.

In particular, the invention relates to a cap provided with a retaining ring, which can be associated with a neck of the container, the cap being also provided with a closing element which, after opening, remains connected to the retaining ring and a combination of a cap and of a neck of the container, to which the cap is associated. The invention also relates to the method for making the cap for the container, in which the closing element remains connected to the retaining ring after opening.

The cap, and the combination of cap and neck, is particularly, but not exclusively, suitable for bottles designed to contain liquid substances.

There are prior art caps for bottles comprising a cup-shaped body provided with an inner thread designed to engage with an outer thread of a neck of the bottle. The prior art caps are also provided with a security ring connected to the cup-shaped body by means of a tear line provided with a plurality of breakable elements, for example breakable bridges. When the cap is opened for the first time the cup-shaped body separates from the security ring along the tear line following breakage of the breakable elements. The security ring remains associated with the neck of the bottle, whilst the cup-shaped body can be unscrewed by the user, which in this way separates the cup-shaped body from the bottle to access the contents of the bottle. Subsequently, the cup-shaped body can be re-screwed on the neck to reclose the bottle.

Sometimes, after the bottle has been emptied, the user throws the cup-shaped body on the ground, either intentionally or accidentally, whilst the bottle, together with security ring associated with it, should correctly be disposed of in a waste bin. This behaviour is obviously undesired.

To overcome this drawback, caps have been proposed which are provided with a retaining ring, which can be associated with a neck of a bottle, and a closing element, connected to the retaining ring by means of a hinge.

The closing element can be rotated about the hinge between an open condition, in which a user can access the contents of the bottle, and a closed condition, in which the closing element prevents access to the bottle. The hinge keeps the closing element associated with the retaining ring and, therefore, the bottle, preventing the closing element from being thrown on the ground independently of the bottle.

The prior art caps provided with hinge have however the drawback of being rather complicated to manufacture. In effect, the hinge is usually produced in the same mould in which the cap is obtained, particularly by injection moulding or compression moulding.

In order to produce the caps with hinge of known type it is therefore necessary to provide special moulds, different from those which are normally adopted for producing the caps free of the hinge. These moulds are more complicated than the ordinary ones, in particular because the caps with hinge of known type may be provided with undercut parts, which thus require special means in order to be extracted from the mould. Moreover, the caps with the hinge of known type and may have zones with a very reduced thickness, which are difficult to obtain because the molten polymeric material flows with difficulty in the portions of the mould intended to form these zones. This increases the costs for the production of the caps with hinge and/or the cycle time necessary obtain them.

The prior art caps provided with a hinge have, however, a further drawback linked to the fact that the retaining ring, in the open condition, when a user inclines the bottle to pour the contents, can easily rotate and cause the closing element connected to it to also fall downwards by gravity, which in this way can be positioned facing and below the dispensing opening. The user is therefore forced to manually lock the cap before inclining the bottle, in order to avoid undesired splashes or deviations of the content to be poured and have the guarantee that the closing element does not disturb the dispensing.

An aim of the invention is to improve the caps of known type, particularly the caps comprising a retaining ring designed to remain associated with a neck of the container and a closing element removably engageable with the neck to allow a user to open or alternatively close the container.

A further aim is to provide a cap for a container, provided with a closing element which remains connected to the retaining ring, which in addition can remain stably locked in a position after opening.

Another aim of the invention is to improve the production method of the caps of known type, particularly the caps comprising a retaining ring designed to remain associated with a neck of the container and a closing element removably engageable with the neck to allow a user to open or alternatively close the container.

Yet another aim of the invention is to improve a combination of cap and neck of known type, particularly wherein the caps comprising a retaining ring designed to remain associated with a neck of the container and a closing element removably engageable with the neck to allow a user to open or alternatively close the container.

According to a first aspect of the invention, there is a cap for a container according to claim 1 and the claims dependent thereon.

More in detail, according to this first aspect of the invention, there is a closing cap for a container, comprising a lateral wall extending about an axis and a transversal edge positioned at one end of the lateral wall, a separation line being provided on the lateral wall to define: a retaining ring, which is configured to remain anchored to the neck; a closing element removably engageable with the neck, in such a way as to open or close the container; wherein the separation line extends about an axis, the circumferential separation line being interrupted to leave the retaining ring and the closing element joined, and wherein the retaining ring comprises: a retaining portion, which is configured to internally engage with a locking ring of the neck and it extends up to a free edge of the retaining ring; a joining portion at which the retaining ring is joined to the closing element; a first connecting band, which extends from a first end zone of the joining portion to the retaining portion, and a second connecting band, which extends from a second end zone of the joining portion to the retaining portion, the second end zone being positioned circumferentially on the opposite side to the first end zone; a tab, interposed between the connecting bands, the tab protruding with respect to the first end zone and to the second end zone of the joining portion towards the free edge so that, when the closing element is in an open condition and the connecting bands keep the closing element connected to the retaining ring, the tab can rest on the neck.

According to a second aspect of the invention, there is a cap for a container according to claim 22 and the claims dependent thereon.

In detail, in accordance with this second aspect of the lateral connection, there is a closing cap for a container, comprising a lateral wall extending about an axis and a transversal wall positioned at one end of the lateral wall, a separation line being provided on the lateral wall to define a retaining ring, which is configured to remain anchored to a neck of the container and to a free edge; a closing element removably engageable with the neck, so as to open or close the container; the separation line extending around the axis and being circumferentially interrupted to leave the retaining ring and the closing element joined; wherein the retaining ring comprises: a joining portion at which the retaining ring is joined to the closing element; a first connecting band, which extends from a first end zone of the joining portion, and a second connecting band, which extends from a second end zone of the joining portion, the second end zone being positioned circumferentially on the opposite side to the first end zone; a tab, interposed between the first connecting band and the second connecting band so that, when the closing element is in an open condition and the connecting bands keep the closing element connected to the retaining ring, the tab can rest on the neck; wherein the tab comprises a pair of lateral edges and a bottom edge, the bottom edge being aligned with a first free lower edge and a second lower free edge of the first connecting band and of the second connecting band; and wherein on the lateral wall there are an incision line which extends between the separation line and the free edge of the retaining ring, defines the bottom edge of the tab, the first free lower edge of the first connecting band and the second free lower edge of the second connecting band and is made by means of a cut line of the lateral wall; two cut lines which define the respective lateral edges of the tab and are made by means of cuts passing through an entire thickness of the lateral wall.

According to a third aspect of the invention, there is a combination of a closing cap for a container and a neck of the container, on which the cap is applied, according to claim 33 and the claims dependent thereon.

In detail, according to this aspect of the invention, there is a combination of a closing cap for a container and a neck of the container, wherein the cap comprises a lateral wall extending about an axis and a transversal wall positioned at one end of the lateral wall, a separation line being provided on the lateral wall to define: a retaining ring, which is configured to remain anchored to the neck; a closing element removably engageable with the neck, in such a way as to open or close the container; the separation line extending about the axis and being interrupted to leave the retaining ring and the closing element joined; the retaining ring comprising: a retaining portion, which is configured to internally engage with a locking ring of the neck and it extends up to a free edge of the retaining ring; a joining portion at which the retaining ring is joined to the closing element; a first connecting band and a second connecting band, which extend from the joining portion to the retaining portion; a tab, circumferentially interposed between the first connecting band and the second connecting band, which projects towards the free edge; wherein the locking ring projects from an outer surface of the neck and extends in a direction parallel to the axis between an upper end, nearer a dispensing opening of the neck and a lower end; and wherein the connecting bands are made by means of an incision line which extends between the separation line and the free edge and comprise a first lateral stretch and a second lateral stretch which partially define, respectively, the first connecting band and the second connecting band, wherein the first lateral stretch and the second lateral stretch, when the closing element is in a closed condition, are positioned beyond, or at, the lower end of the locking ring towards the dispensing opening, so that when the closing element is in an open condition and the connecting bands keep the closing element connected to the retaining ring, the tab can rest on the neck beyond the upper end of the locking ring towards the dispensing opening.

According to these three aspects of the invention, the joining portion makes it possible to keep the closing element stably associated with the retaining ring and therefore with the neck of the container. This prevents the closing element from being thrown on the ground separately from the container. This thus increases the probability that the closing element, together with the container, is correctly disposed of together with waste of the same type, in particular together with plastic material waste.

The tab, which is positioned in the joining portion, is interposed between the first end zone of the first connecting band and the second end zone of the second connecting band and protrudes from them, or is aligned with a first free lower edge and a second free lower edge of the first connecting band and of the second connecting band, allows the closing element to be stably locked on the neck of the container, since a bottom edge of the tab rests on the neck and prevents the any rotational movement of the closing element, both towards the closing element and around the neck of the bottle. Advantageously, the tab rests on the neck close to the locking ring. In this way, the closing element is locked in the movement towards the dispensing opening, since the tab interferes with the locking ring, or with zones of the neck close to it, and cannot rotate further. Moreover, the retaining ring is also locked in the rotation about the neck, due to the friction between the tab and the locking ring which prevents the tab from sliding laterally on the locking ring.

The closing element cannot, therefore, fall by gravity.

The user can close the bottle again only after disengaging the tab from the locking ring.

Advantageously, in order to obtain the connecting bands and a bottom edge of the tab, an incision line is made which extends between the separation line and the free edge of the retaining ring.

In addition, in order to obtain the lateral edges of the tab, two cut lines are made on a lateral wall of the cap which extend parallel to the axis of the cap.

Consequently, the cap according to the invention may be produced in a relatively simple manner, without need to use special moulds. In effect, the cap according to the invention may be produced in a traditional mould which makes it possible to obtain a concave body and the incision line and the cut lines for making the lateral edges and the bottom edge of the tab may be made as incision lines by means of a cutting operation on the concave body.

The incision lines may pass through the entire thickness of the lateral wall, or not passing through, if the thickness of the lateral wall is to be cut only partly.

Preferably, the incision line and the cut lines are made by means of through cuts for an entire thickness of the lateral wall.

Optionally, there may be breakable elements on the incision line.

However, the incision line and the cut lines can also be made by moulding, suitably shaping the mould in which the cap is produced, without, however, causing excessive complications of the mould, thanks to the particularly simple shape of the incision line and the cut lines.

In this case, the incision line may also be shaped like a line of weakness.

If, in accordance with the first and third aspect of the invention wherein the tab protrudes relative to the connecting bands, the incision line comprises a first lateral stretch and a second lateral stretch which lie in a first plane parallel to a separation plane in which lies the separation line and a central stretch which extends on a second plane parallel to the separation plane and is interposed between the first plane and the free edge of the retaining ring.

The connecting bands and the tab are made with the separation line and the incision line which are positioned on three planes parallel to each other.

Thanks to the fact that, in accordance with the third aspect of the invention, the first lateral stretch and second lateral stretch of the incision line, when the closing element is in a closed condition, are positioned beyond the lower end of the locking ring towards the dispensing opening, or at the lower end, it follows that, when the closing element is in an open condition and the connecting bands keep the closing element connected to the retaining ring, the tab can rest on the neck beyond the upper end of the locking ring towards the dispensing opening.

This allows the tab to rest on a coupling structure of the neck, for example shaped like a thread, beyond the locking ring, making even more stable the combination between the cap and the neck on which the cap is applied.

According to the second aspect of the invention, wherein the tab is aligned with the connecting bands, the incision line defines the bottom edge of the tab, the first free lower edge of the first connecting band and the second free lower edge of the second connecting band, and extends on a plane which is parallel to the separation plane. Advantageously, the separation line and the incision line extend only on two planes parallel to each other and this makes it possible to obtain a cap which, whilst stably locking on the neck of the container in the open condition, is simple to make.

In accordance with the previous aspects of the invention, advantageously, the connecting bands, the joining portion, and the tab, define a hinge arrangement which has a capacity of movement, in an axial direction, considerably greater than the capacity of movement which would be allowed by the joining portion only. This hinge arrangement allows the closing element to be moved away from the security ring along a significant axial distance, determined by the combination of the length of the connecting bands and the joining portion. Thanks to the fact the tab is interposed between the connecting bands, the closing element can be easily disengaged from the neck of the container, even if the tab is resting on the neck and interferes with the locking ring, since the capacity of movement and deformation of the connecting bands can be used.

According to one version, considering a centre line of the joining portion, a centre line of the tab coincides with the centre line of the joining portion and the connecting bands are positioned symmetrically relative to a plane containing the axis and the centre line of the joining portion.

The symmetrical shape of the tab, interposed between the connecting bands, makes it possible to reduce the involuntary movements of the closing element when the cap is in an open condition and the closing element is locked resting on the neck close to the locking ring, in particular limiting the lateral movements. In this way, the cap cannot rotate.

It should also be noted that the joining portion, which also comprises the protruding tab, or aligned with the connecting bands, is robust so much that it is difficult to accidentally separate the retaining ring from the closing element.

The invention can be better understood and implemented with reference to the accompanying drawings which illustrate non-limiting example versions of it and in which:

FIG. 1 is a side view of a closing cap for a container according to a first aspect of the invention, in combination with a neck on which the cap is applied, comprising a closing element and a retaining ring, in a closed condition, wherein the cap comprises a first connecting band, a second connecting band and a tab interposed between the first connecting band and the second connecting band, wherein the tab has an outer part protruding relative to the connecting bands.

FIG. 2 is a side view of a version of the cap of FIG. 1, in the closed condition, wherein the tab comprises an outer part, protruding relative to the connecting bands, and an inner part;

Figure 1:
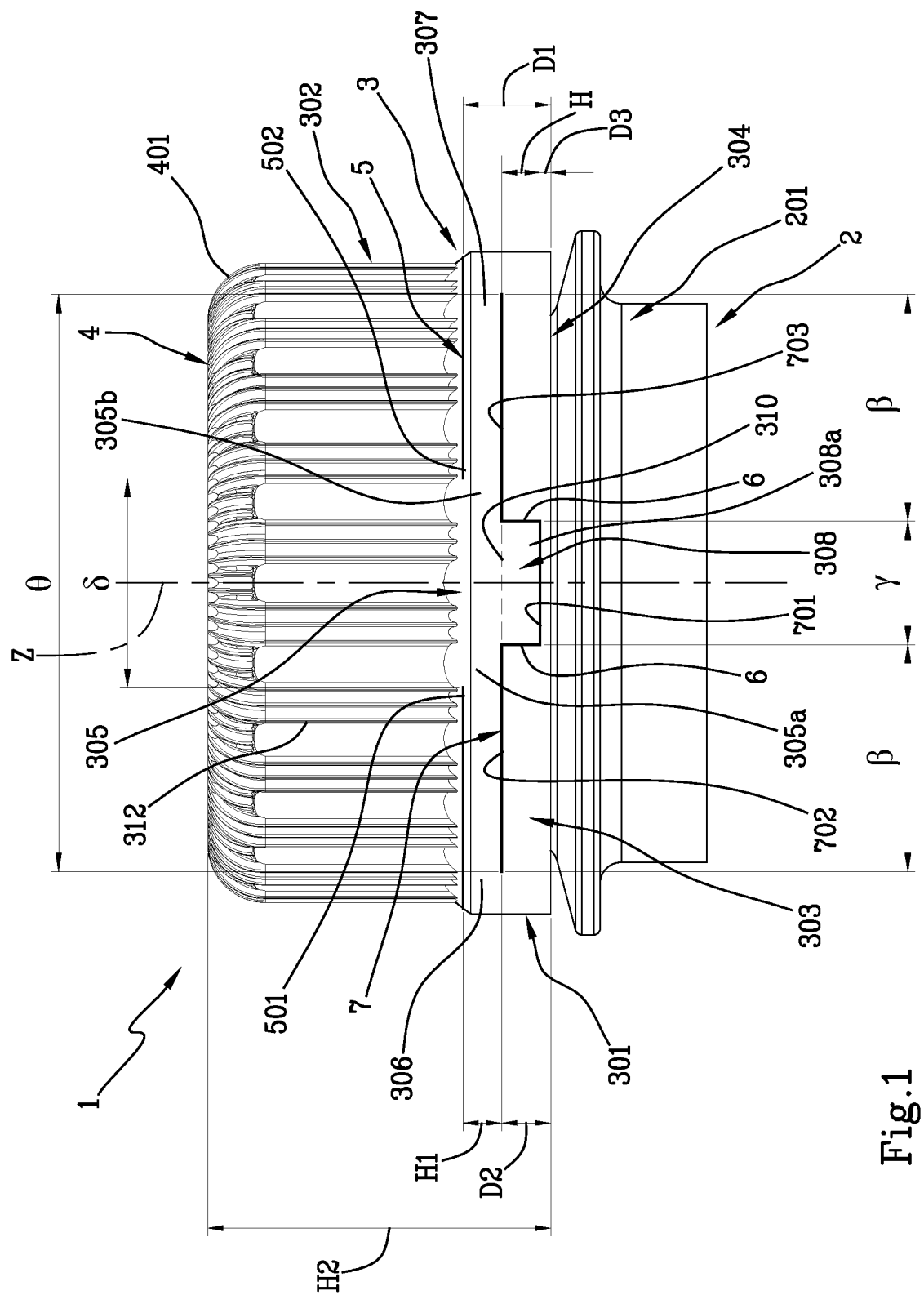
FIG. 1A is a side view of the cap of FIG. 1 in an open configuration, wherein the closing element is spaced from the neck of the container and the tab is locked resting on the neck, close to a ring for locking the neck.
FIG. 1B shows an enlargement of FIG. 1A.

With reference to the accompanying drawings, the numeral 1 denotes a cap for closing a container 2, of which only a neck 201 is shown, particularly a bottle designed to contain a liquid substance such as a drink.

It should be noted that elements common to the different embodiments will be indicated with the same reference numerals.

The cap 1 is made of polymeric material. Any polymeric material designed to be moulded can be used to obtain the cap 1.

The cap 1 is shown in FIG. 1 in a closed condition in which the cap 1 is located when it leaves a cap production line and is applied to the neck 201 of the container 2, in combination with it.

In this condition, the cap 1 comprises a lateral wall 3 which extends about an axis Z, and a transversal wall 4 positioned at one end of the lateral wall 3, so as to close the end. The transversal wall 4 extends transversally, in particular perpendicularly, to the axis Z. The transversal wall 4 may be flat, even though other shapes are theoretically possible. In the example illustrated, the transversal wall 4 has a substantially circular shape in plan view.

The lateral wall 3 and the transversal wall 4 define a cup-shaped body, designed to receive an end portion of the neck 201 of the container 2, so that the cap 1 can close the container 2.

More specifically, the lateral wall 3 is connected to the transversal wall 4 by a connecting zone 401, which may be shaped, in cross section, like a bevelled edge or a circular connector.

The cap 1 comprises a separation line 5, which is provided on the lateral wall 3 to define a retaining ring 301, which is configured to remain anchored to the neck 201 of the container 2.

More in detail, the retaining ring 301 is configured to engage internally with a locking ring 202, which projects from an outer surface of the neck 201, in such a way as to remain anchored to the neck 201.

The locking ring 202 is an annular enlargement, which extends in a plane positioned transversally to the axis Z.

The separation line 5, on the lateral wall 3, defines, in addition to the retaining ring 301, a closing element 302 removably engageable with the neck 201, so as to open or close the container 2. The closing element 302 can be engaged for closing a dispensing opening 203 of the container 2.

The separation line 5 extends about the axis Z and is circumferentially interrupted so as to leave the retaining ring 301 and the closing element 302 joined together. More in detail, the separation line 5 extends between a first end 501 and a second end 502. The separation line 5 may have an angular extension, about the axis Z, greater than or equal to 240° and less than, or equal to, 350°.

In one version, the angular extension of the separation line 5 may be between 250° and 340°, preferably between 320° and 330°.

It should be noted that the expression "the angular extension is between" 250° and 340° means, in all this document, that it may be greater than, or equal to, 250° and less than, or equal to, 340°, in other words, the ends of the range indicated are always included therein and are not excluded.

The retaining ring 301 comprises a retaining portion 303, which is configured to engage internally with the locking ring 202 and extends up to a free edge 304 of the retaining ring 301.

The free edge 304 delimits the retaining ring 301 on the side opposite the transversal wall 4. The retaining ring 301 therefore extends between the separation line 5 and the free edge 304 and may be delimited by a cylindrical or truncated cone shaped outer surface. Preferably, the separation line 5 is parallel to the free edge 304. In other words, the retaining portion 303 is a lower portion of the retaining ring 301, and therefore of the cap 1, when the cap is joined to the container 2 and is configured to retain anchored the retaining ring 301 to the neck 201 of the container 2.

The retaining ring 301 in addition comprises:
  a joining portion 305 at which the retaining ring 301 is joined to the closing element;
  a first connecting band 306 and a second connecting band 307 which extend from the joining portion 305 to the retaining portion 303.

More in detail, the first connecting band 306 and the second connecting band 307 extend from end zones 305a, 305b circumferentially opposite the joining portion 305 up to the retaining portion 303. The first connecting band 306 extends from a first end zone 305a of the joining portion 305 to the retaining portion 303, and the second connecting band 307 extends from a second end zone 305b of the joining portion 305 to the retaining portion 303, the second end zone 305b being circumferentially opposite the first end zone 305a.

If the first end 501 and the second end 502 of the separation line 5 are considered, the first end zone 305a and the second end zone 305b of the joining portion 305 are respectively immediately adjacent to the first end 501 and to the second end 502 and are therefore positioned circumferentially on the opposite side in the joining portion 305.

The first connecting band 306 and the second connecting band 307 are therefore positioned circumferentially on the opposite side in the joining portion 305.

The retaining ring 301 comprises a tab 308.

The tab 308 is circumferentially interposed between the first connecting band 306 and the second connecting band 307 and protrudes towards the free edge 304 so that, when the container 2 is in the open condition and the first connecting band 306 and the second connecting band 307 keep the closing element 302 connected to the retaining ring 301, the tab 308 can rest on the neck 201 of the container 1.

More in detail, the tab 308 is interposed between the connecting bands 306, 307 and protrudes relative to the first end zone 305a and the second end zone 305b of the joining portion 305 towards the free edge 304.

The tab 308 rests on the neck 201 for locking the closing element 302 spaced from the neck.

It should be noted that the tab 308 is made exclusively as an outer part 308a, projecting relative to the first end zone 305a and to the second end zone 305b. As shown in FIG. 1, the separation line 5 is positioned at a distance D1 along an axis parallel to the axis Z from the free edge 304 of the retaining ring 301. The height of the retaining ring 301 along an axis parallel to the axis Z is therefore equal to D1. The distance D1 is less than or equal to 6.5 mm. Preferably, the distance D1 is less than or equal to 5 mm.

The distance D1 is greater than or equal to 2 mm. Preferably, the distance D1 is greater than or equal to 3 mm.

In a preferred version, the distance D1 is between 3 and 5 mm.

It should be noted that the term H denotes a height of the tab 308, which H1 denotes a height of the connecting bands 306, 307 and that D2 denotes a height of the retaining portion 303, along an axis parallel to the axis Z when the closing element 302 is in the closed condition.

Figure 1A:
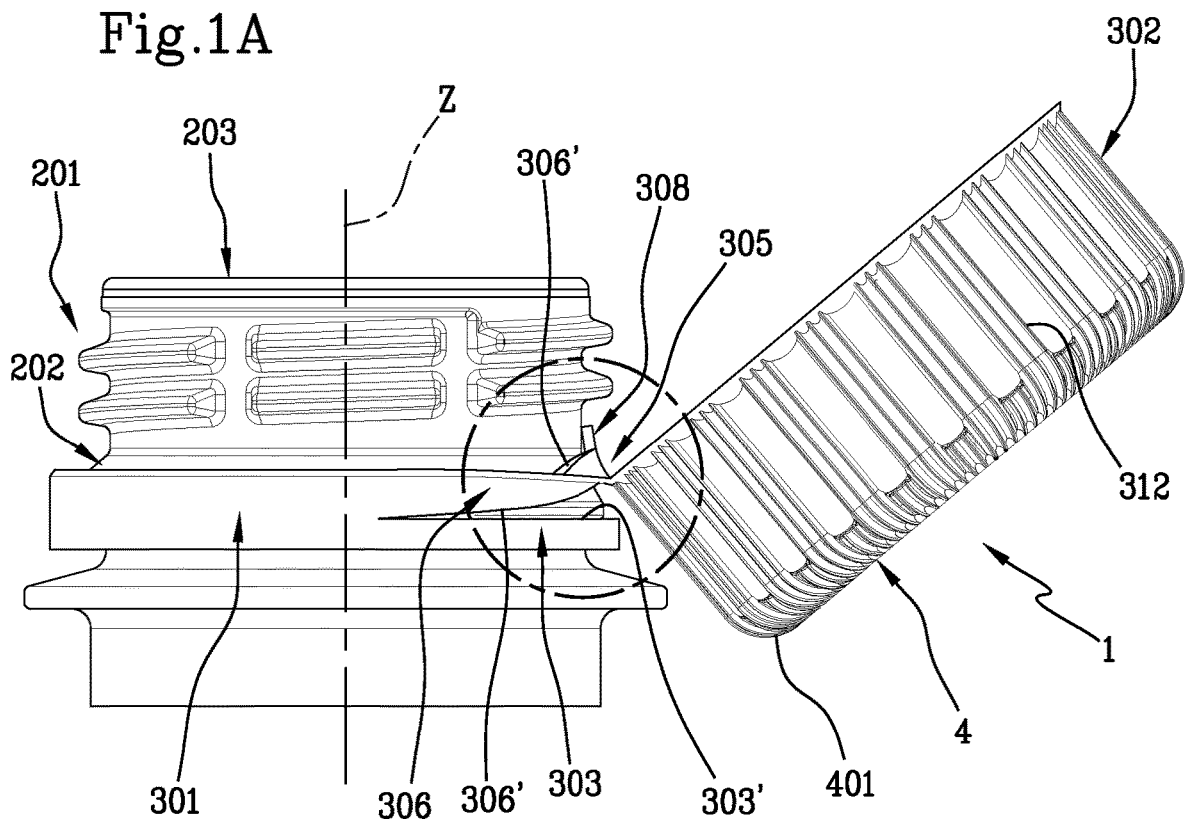
Figure 1B:
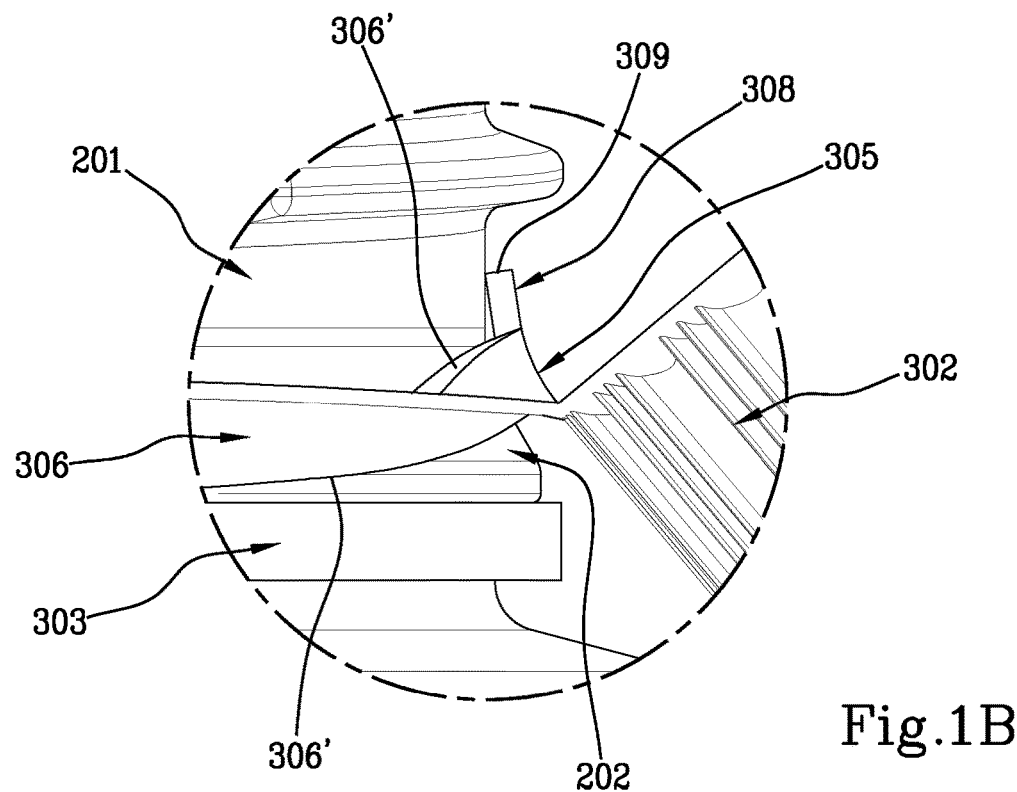
Figure 3:
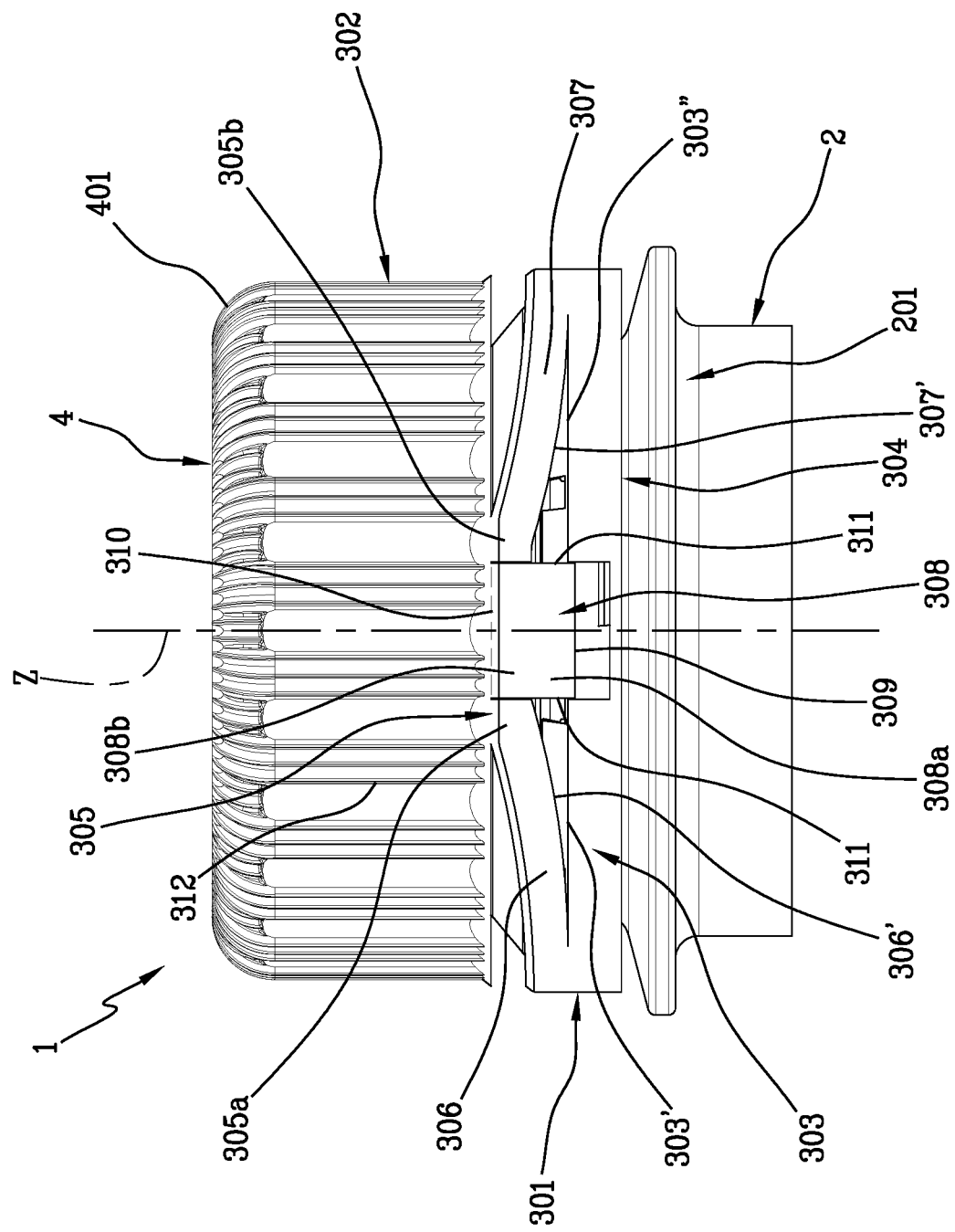
FIG. 3 is the side view of the cap of FIG. 2, in an initial open condition, wherein the closing element of the cap starts to be separated from the retaining ring and the tab is still partly received in a retaining portion of the retaining ring.

In the open condition shown in FIGS. 1A and 1B, thanks to the connecting bands 306, 307, connected to the joining portion 305, the closing element 302 can rotate relative to the neck 201 of the container 2 around the joining portion 305, which defines in this way a hinge band which keeps connected the closing element 302 relative to the neck 201, deforming.

In other words, as shown in FIGS. 1A and 1B, after being disengaged from the neck 201, the closing element 302 is rotated about the joining portion 305.

It should be noted that the joining portion 305, the first connecting band 306, the second connecting band 307 and the tab 308 are joined together and define a hinge arrangement which has a capacity of movement, in an axial direction, considerably greater than the capacity of movement which would be allowed only by the joining portion 305, as described in more detail below.

The hinge arrangement is a part of the retaining ring 301 which is interposed between the retaining portion 303 of the retaining ring 301 and the closing element 302.

It should be noted that, when the tab 308 is resting on the neck 201, a bottom edge 309 of the tab 308 faces towards the dispensing opening 203 of the container 2.

The tab 308 is, in effect, connected to the lateral wall 3 by a hinge line 310, about which the tab 308 can optionally bend for resting on the neck 201 close to the locking ring 202.

It should be noted that the hinge line 310 is a virtual line which defines in the lateral wall 3 a zone about which the tab 308 may optionally bend, which may also be part of the hinge band of the joining portion 305, relative to the height H of the tab 308, or positioned closer to the free edge 304, or also on the lateral wall 3, as described in more detail below.

The bottom edge 309 is a free edge of the tab 308, which is positioned on the opposite side relative to the hinge line 310.

To make possible the rotation of the joining portion 305 when the closing element 302 passes from the closed condition to the open condition, as shown in FIGS. 1A and 1B, the connecting bands 306 and 307 undergo a twisting which affects at least a part of the height H1 of each connecting band 306, 307.

Thanks to the fact that the tab 308 projects relative to the first end zone 305a and to the second end zone 305b, the bottom edge 309 is able to intercept the neck 201 of the container 2 without interference by the first connecting band 306 and the second connecting band 307, which remain withdrawn relative to it.

Even if a user accidentally strikes the closing element 302 and stresses the first connecting band 306 and the second connecting band 307, the closing element 302 is locked spaced from the neck 201 and cannot move towards it since the tab 308 is locked in rotation towards a bottom of the container by the neck 201.

When the closing element 302 is in the open condition, between the closing element 302, positioned spaced from the neck 201, and an axis parallel to the axis Z and tangential to the lateral surface of the neck 201, an angle of opening is defined at least equal to 30°, which guarantees that the closing element 302 does not interfere with the dispensing of the contents of the bottle when the bottle is inclined.

The closing element 302 is positioned inclined and the shape of the locking ring 202 and/or the retaining ring 301 and/or the tab 308 can contribute to determining the inclination of the closing element 302, as described in more detail below.

If now a plane is considered passing through the axis Z, the joining portion 305 has a thickness S substantially constant on a plane containing the separation line 5. In effect, no lightening or particular shapes of zones of the lateral wall of the cap 1 are necessary to make the joining portion 305.

Figure 17:
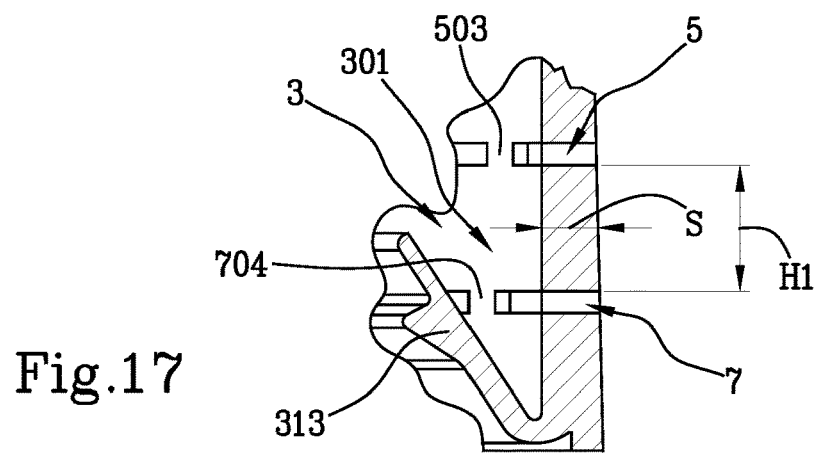
FIG. 17 shows an enlarged detail of a cap of the preceding drawings.

In effect, as shown in FIG. 17, each connecting band 306, 307 may have a radial thickness S, that is to say, a thickness measured in a radial direction relative to the axis Z, greater than, or equal to, 0.35 mm. This thickness may be less than, or equal to, 1.8 mm.

In one version, the radial thickness S of each connecting band 306, 307 may be greater than, or equal to, 0.5 mm. This thickness may be less than, or equal to, 1.2 mm.

The radial thickness S of the connecting bands 29, 30 may be, preferably, constant in a direction parallel to the axis Z.

Alternatively, the radial thickness S of the connecting bands 306, 307 may be variable in a direction parallel to the axis Z. In particular, the radial thickness S of the connecting bands 306, 307 may vary along a direction parallel to the axis Z, in such a way as to remain inside the intervals indicated above.

In one version, with relatively large radial thicknesses S of the connecting bands 306, 307 corresponds to a height H1 of relatively small connecting bands 306, 307, and vice versa.

It is, however, also possible to combine relatively large radial thicknesses S of the connecting bands 306, 307 with a relatively large height H1.

Also considering a plane passing through the axis Z, it may be noted that the locking ring 202 (FIG. 6) has a triangular cross-section and has an upper wall 202a, facing towards the dispensing opening 203, which is inclined relative to a base wall 202b of the locking ring 202 facing towards a bottom of the container 2. The locking ring 202 has, in other words, the upper wall 202a with a frustoconical shape.

A cylindrical wall (not illustrated) of the locking ring 202 may be interposed between the upper wall 202a and the base wall 202b.

However, other geometries of the locking ring 202 are possible.

Figure 6:
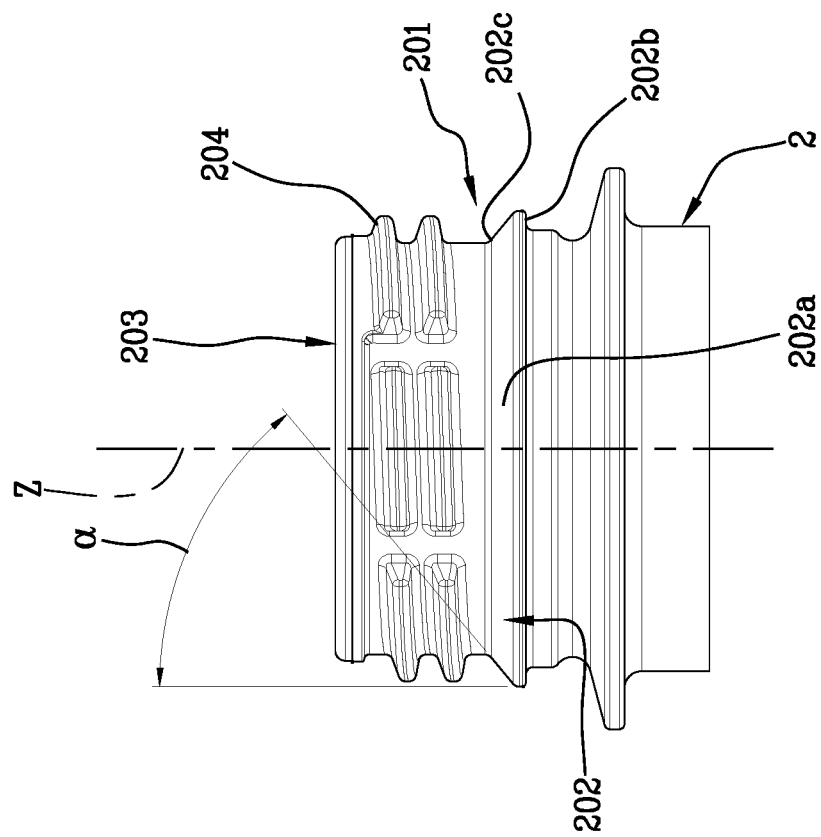
FIG. 6 is a side view of a neck of the container, without the respective closing cap.
Figure 8:
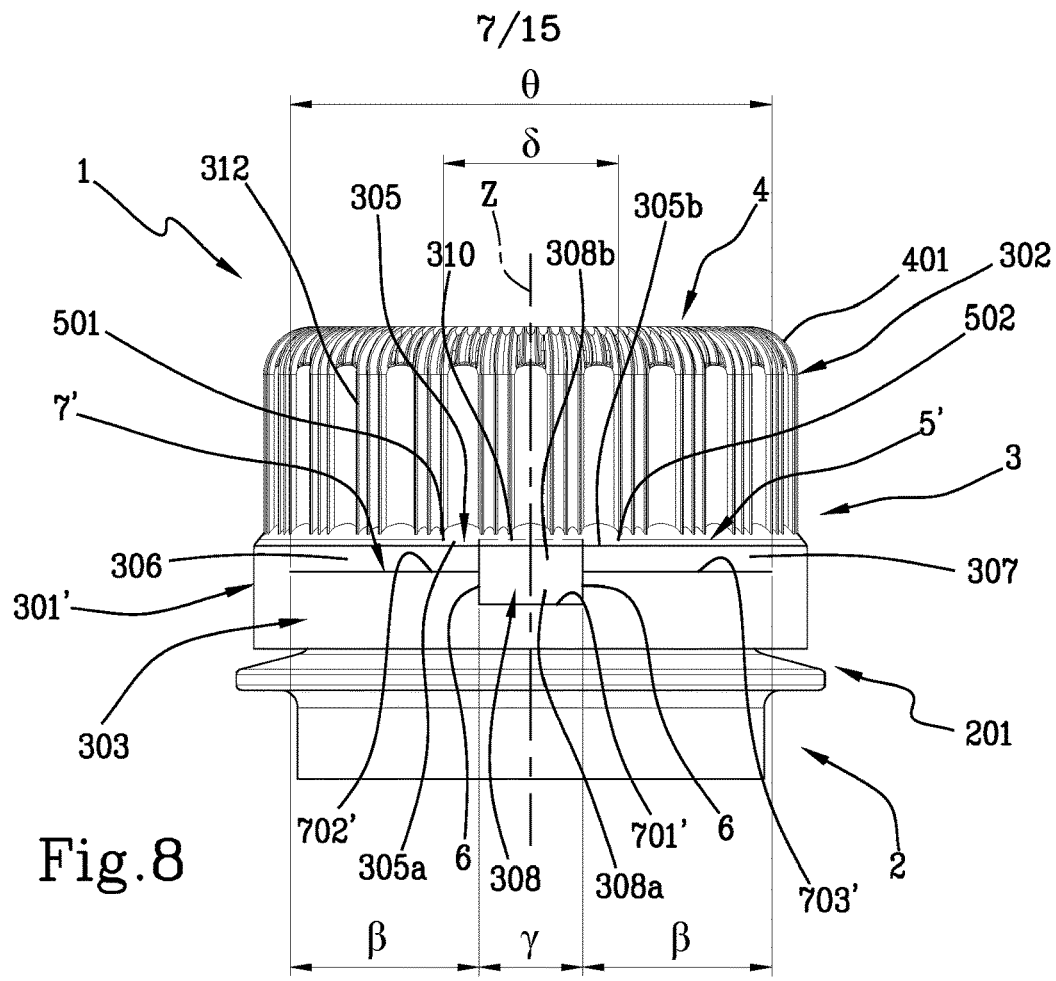
FIG. 8 is a side view of a variant of the cap of FIG. 2, in combination with the neck on which the cap is applied, in the closed condition, according to a third aspect of the invention.
Figure 9:
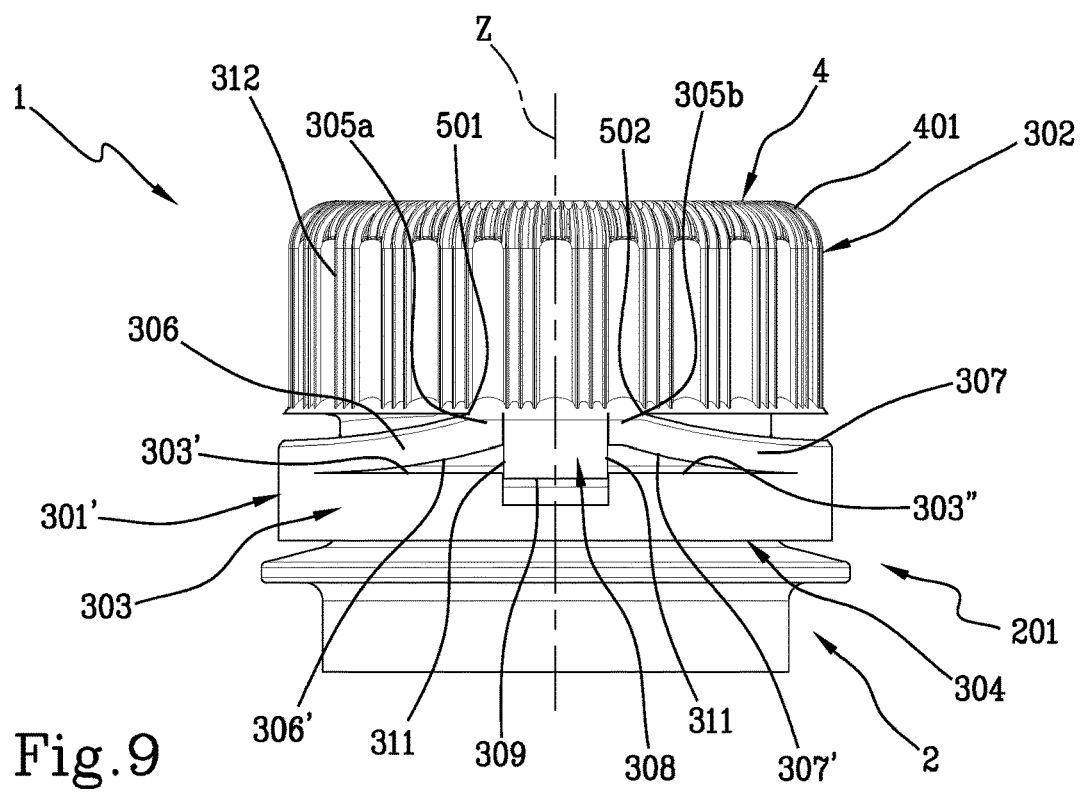
FIG. 9 is the side view of the cap of FIG. 8, in an initial open condition, wherein the closing element of the cap starts to be separated from the retaining ring and the tab is still partly received in a retaining portion of the retaining ring.
Figure 10:
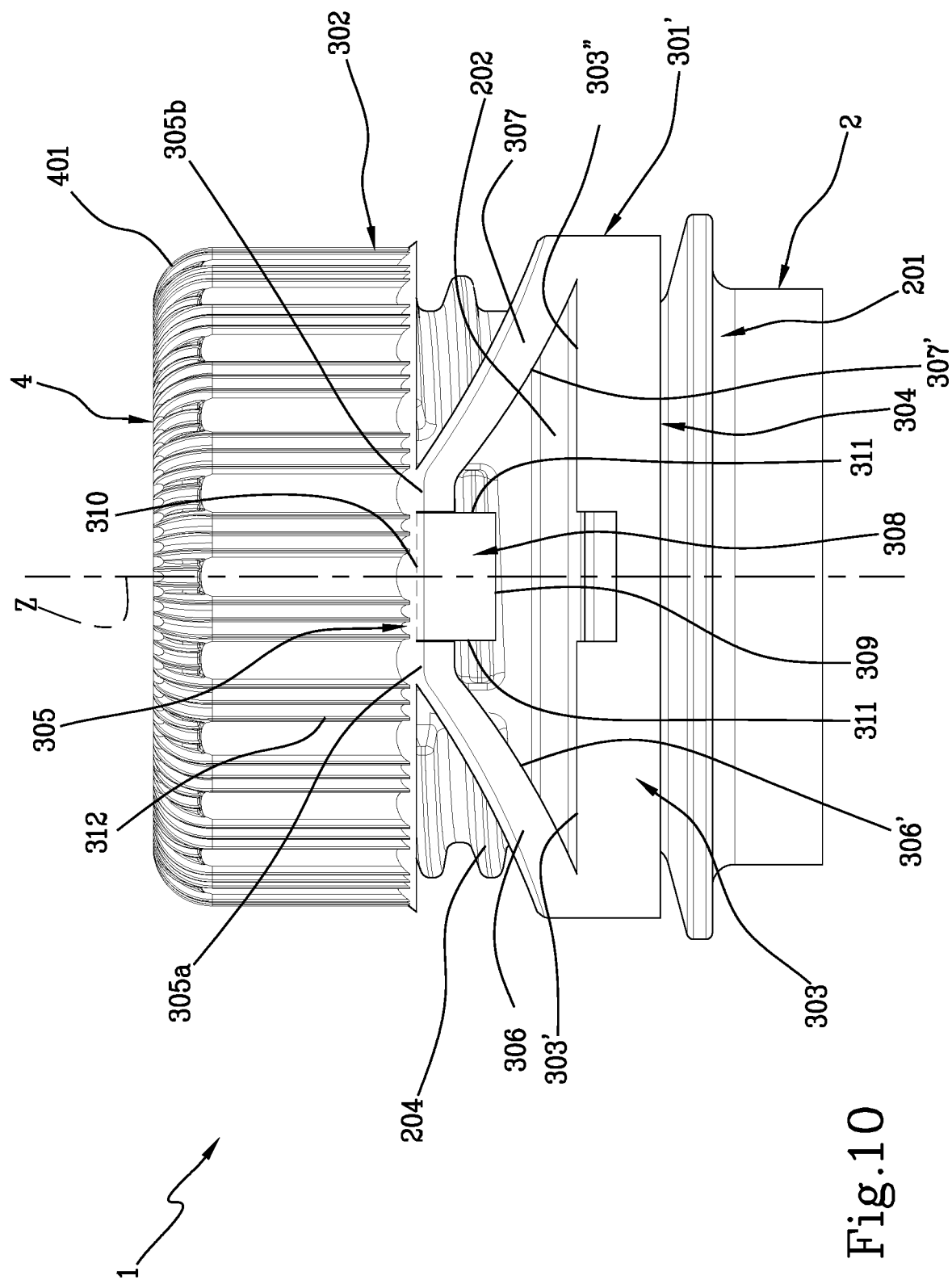
FIG. 10 is the side view of the cap of FIG. 8, in a final open condition, wherein the closing element of the cap is almost completely separated from the retaining ring and the tab is completely disengaged from the retaining portion.

An angle α of 50°, shown in FIG. 6, is defined between an axis parallel to the axis Z, passing through an outer edge of the locking ring 202 and the upper wall 202a.

The inclination of the closing element 302 in the open condition may depend on:
the height H of the tab 308 along an axis parallel to the axis Z and, that is, a distance between the bottom edge 309 and the hinge line 310;
a shape of the retaining ring 301 and of the retaining portion 303 and, that is, the height D2 of the retaining portion 303 along an axis parallel to the axis Z;
the angle α of inclination of the locking ring 202;
a transversal extension of the locking ring 202 and, that is, a semi-difference between a diameter of the locking ring 202 and a diameter of the outer surface of the neck 201, immediately above the locking ring 202.

In addition to the above-mentioned geometrical factors, it has been experimentally demonstrated that for the cap 1 of FIGS. 1, 1A, 1B, 14 and 15, the inclination of the closing element 302 in the open condition, and therefore the stability in the locking of the same on the neck 201, is also determined by a ratio between the height H1 of the connecting bands 306, 307 and the radial thickness S of the connecting bands 306, 307, as described in more detail below, which can deform to guarantee the optimum connection between the neck 201 and the joining portion 305 (and if necessary between the neck 201 and the connecting bands 306, 307) in such a way as to maintain the closing element 201 in the open position in a reliable and secure fashion. The separation line 5 extends on a plane positioned transversally, in particular perpendicularly, to the axis Z. It should be noted that the retaining ring 301 and the closing element 302 are positioned on opposite sides of the separation line 5.

The lateral wall 3 of the cap 1 is provided internally with a coupling structure (not illustrated), configured for removably couple the closing element 302 to the neck 201 of the container 2, in such a way that the cap 1 can be moved from the closed condition, wherein the cap 1 closes the dispensing opening 203 of the container 2, to the open condition.

The coupling structure of the cap 1 is positioned inside the closing element 302 and is shaped to engage with a corresponding coupling structure 204 present externally on the neck 201 of the container 2. The coupling structure of the closing element 302 and the coupling structure 204 of the neck 201 are, as illustrated in the accompanying drawings, made as a thread. In this case, the movement from the closed condition to the open condition is performed by a rotation of the closing element 302 relative to the neck 201 of the container 2.

Advantageously, the tab 308 rests on the neck 201 close to the locking ring 202. In effect, with regard to the shape of the retaining ring 301 and/or of the locking ring 202 and/or of the tab 308, the inclination of the closing element 302 relative to the neck 201 is determined, which in turn determines the resting of the tab 308 on the neck 201. The tab 308 can rest on the neck 201 in different positions of the neck. For example, the tab 308 can be rested:

on the locking ring 202, since the locking ring 202 can define a lower contact element for the tab 308;
in an outer zone of the neck 201 between the locking ring 202 and a lower thread of the coupling structure 204;
on the coupling structure 204;
in a further outer zone of the neck 201 immediately below the base wall 202b of the locking ring 202, since the locking ring 202 can form an upper contact element for the tab 308.

It should be noted that the lateral wall 3 can be provided, on a relative outer surface, with a plurality of knurling lines 312, extending parallel to the axis Z and designed to facilitate gripping of the cap 1 by the user or by the capping machine which applies the cap 1 on the container 2 to be closed.

The knurling lines 312 may be positioned in the closing element 302 but may also continue in the connecting zone 401 and/or in the retaining ring 301.

In the example shown, it should be noted that the lateral wall 3 comprises a cylindrical portion extending up to the connecting zone 401, on which the knurling lines 312 are made, a wide portion extending up to the free edge 304 of the retaining ring 301 and a connecting portion positioned between the cylindrical portion and the wide portion. The wide portion has a diameter greater than the cylindrical portion. The wide portion may be delimited by a smooth outer surface, that is to say, it may be without knurling lines 312 but this is not necessary since the knurling lines 312 could also extend on the wide portion. The closing element 302 is defined by the cylindrical portion, the retaining ring 301 is formed by the wide portion since the separation line 5 is provided on the connecting portion. However, other configurations of the cap 1 might be possible, in relation to the position of the separation line 5 and the extension of the knurling lines 312.

For example, the separation line 5 may be positioned on the cylindrical portion.

Figure 12:
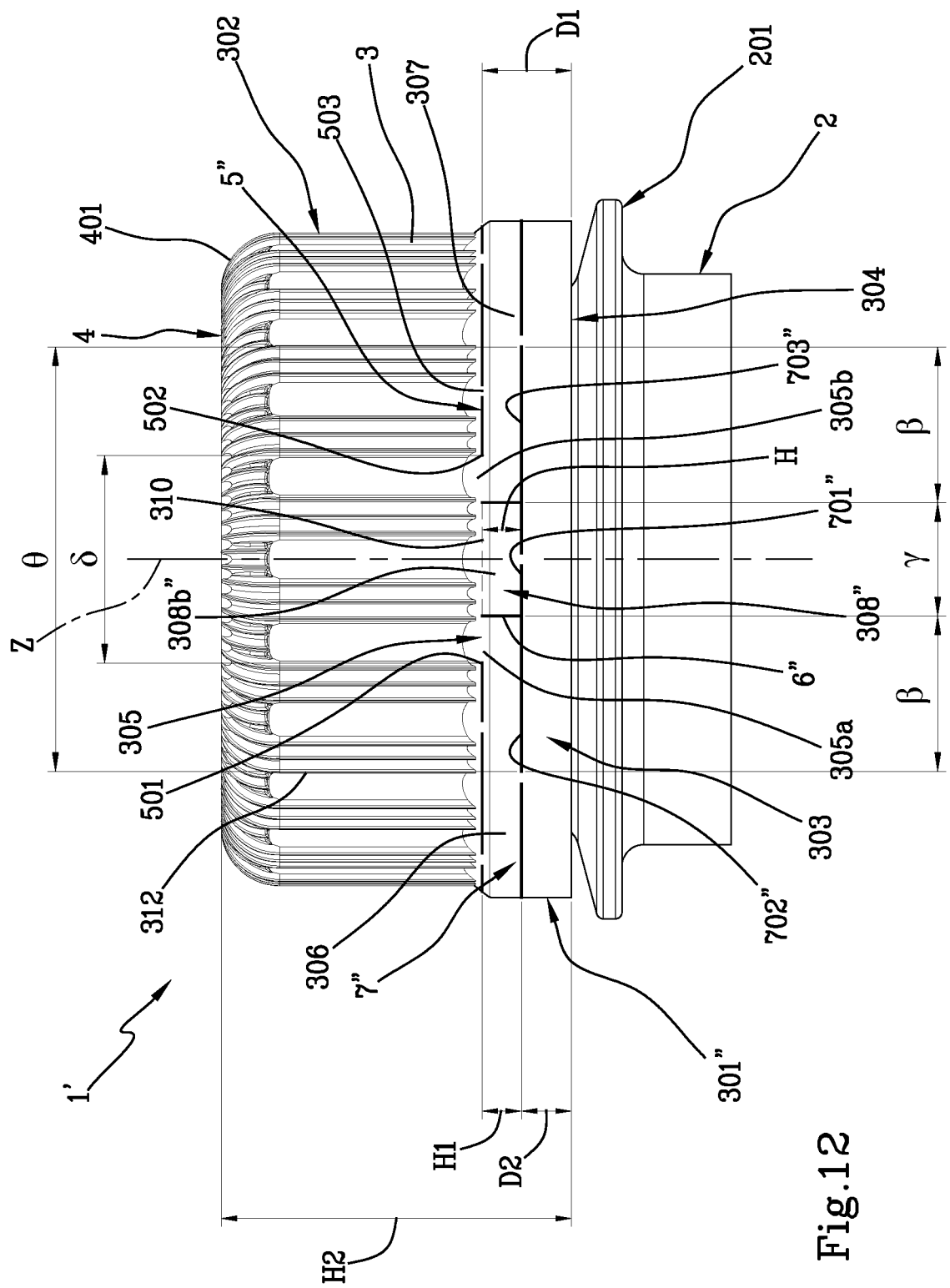
FIG. 12 is a side view of a variant of the cap of FIG. 2, in the closed condition, according to a second aspect of the invention, wherein a bottom edge of the tab is aligned with a first free lower edge and a second free lower edge of the first connecting band and of the second connecting band and the tab has the inner part but not the outer part.
Figure 14:
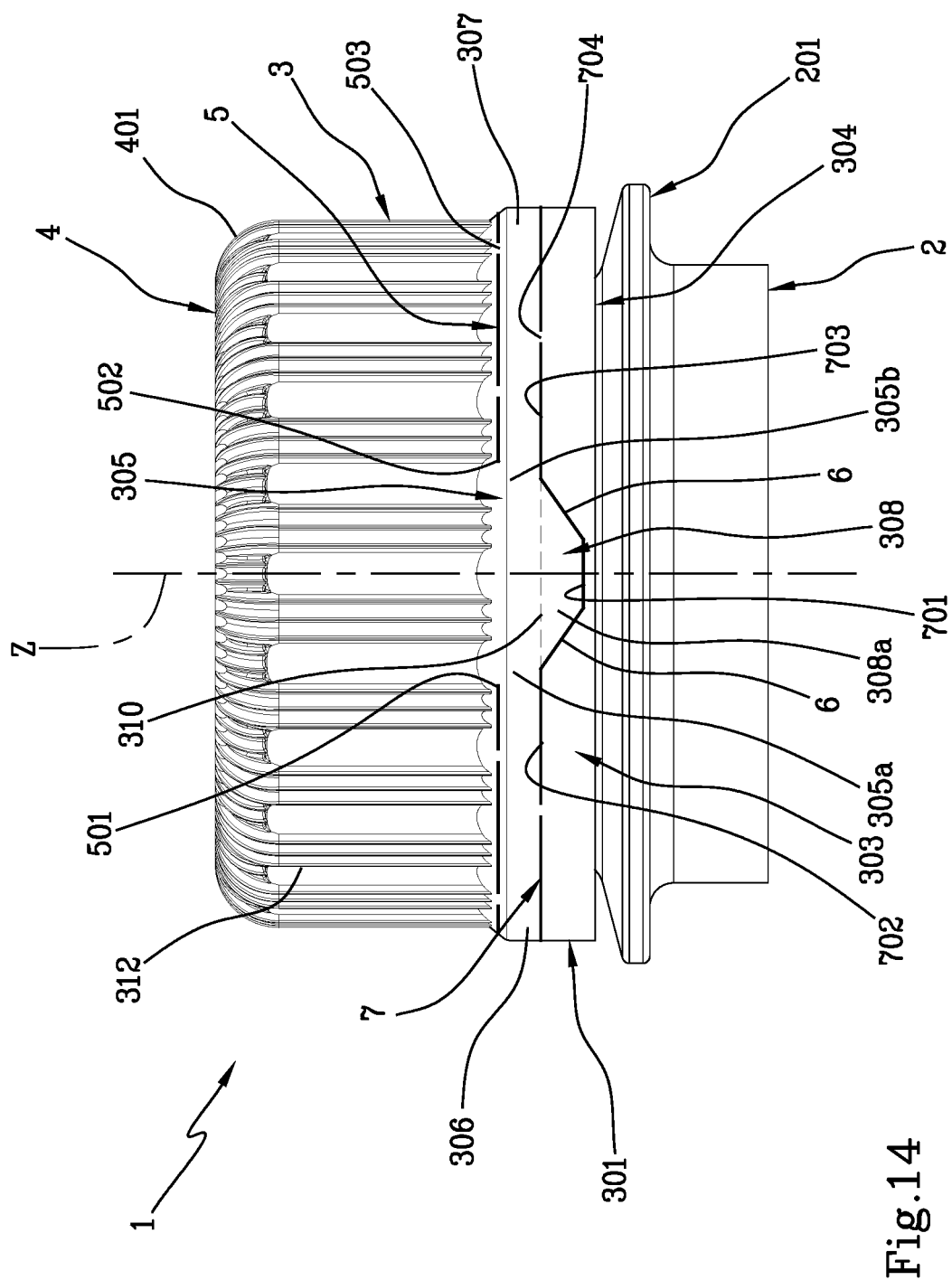
FIG. 14 is a side view of a variant of the cap of FIG. 1, in the closed condition, wherein the tab has a trapezoidal shape.
Figure 15:
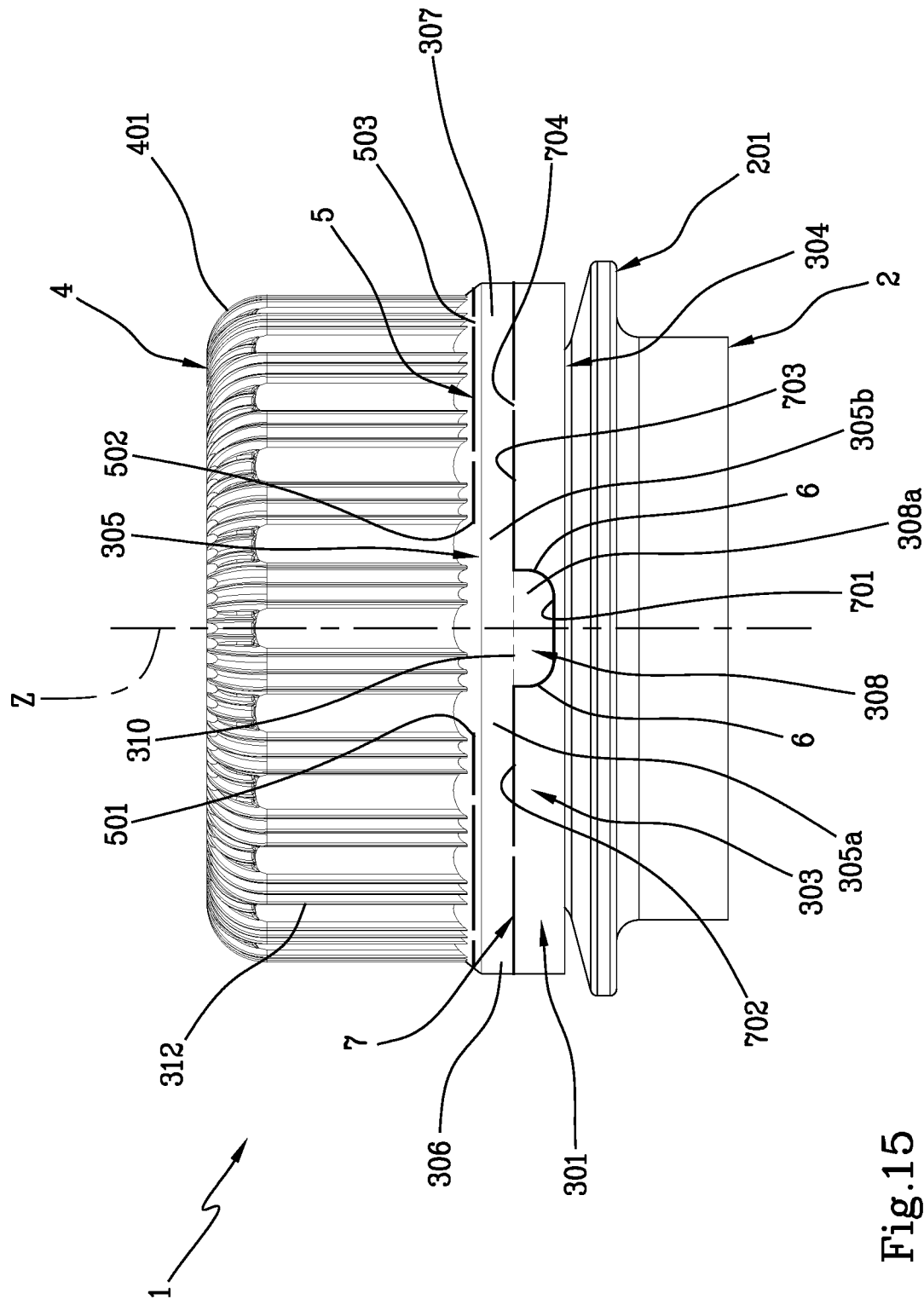
FIG. 15 is a side view of a variant of the cap of FIG. 1, in the closed condition, wherein the tab has a rectangular shape with rounded corners.

Along the separation line 5 there may be a plurality of breakable bridges 503, shown at least in FIGS. 12, 14 and 15, which connect the retaining ring 301 to the closing element 302. The breakable bridges 503 are designed to be broken the first time the cap 1 is moved to the open position, to signal that the container is no longer whole. In this way, the closing element 302 separates from the retaining ring 301 along the separation line 5.

As mentioned above, the retaining ring 301 is configured to engage internally with the locking ring 202 in such a way as to remain anchored to the neck 201.

Figure 4:
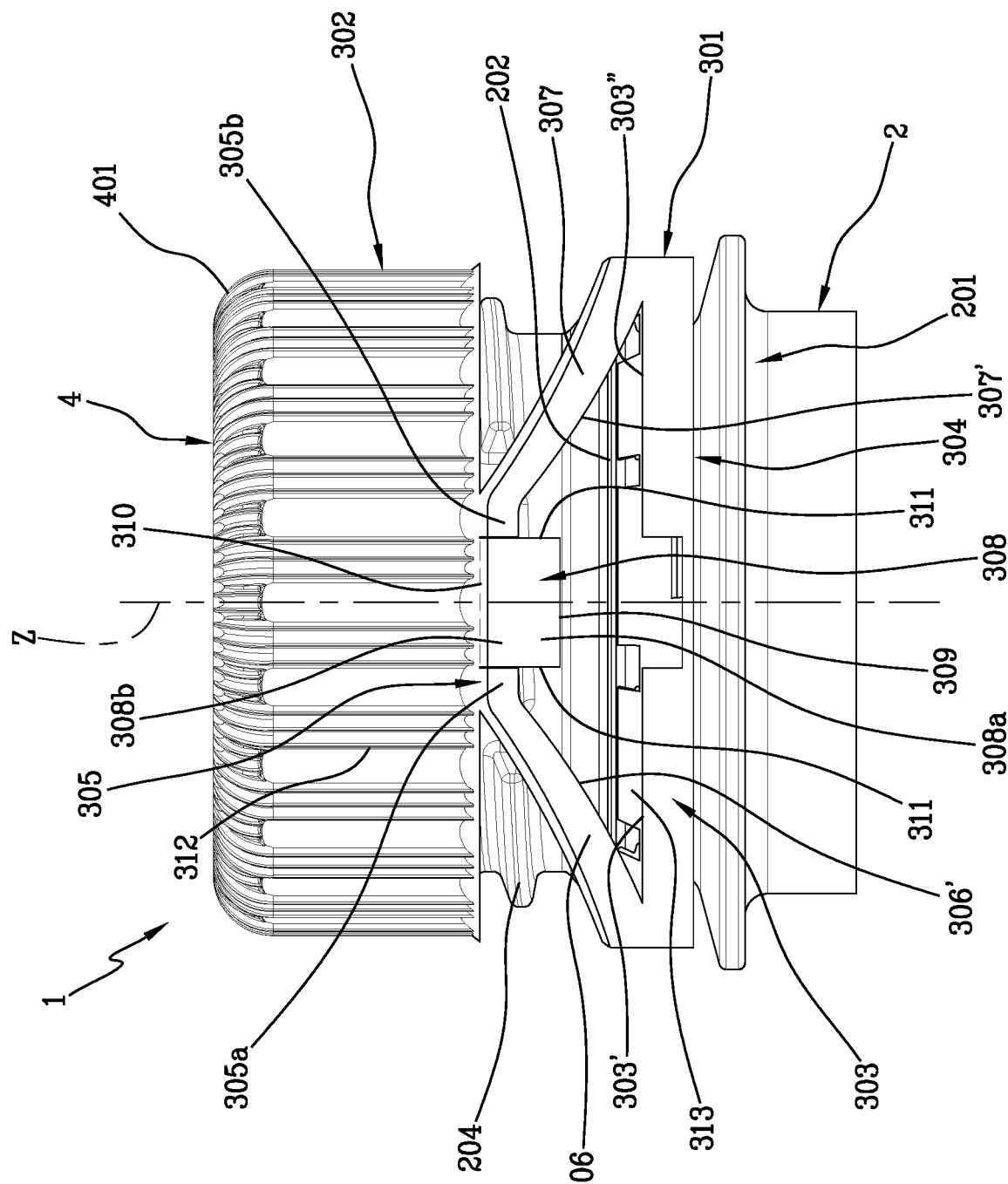
FIG. 4 is the side view of the cap of FIG. 2, in a final open condition, wherein the closing element of the cap is almost completely separated from the retaining ring and the tab is completely disengaged from the retaining portion.

For this purpose, the retaining ring 301 is provided internally with an engagement element 313, shown in FIG. 4 and in FIG. 17, designed to engage with the locking ring 202. The engagement element 313 is configured for making contact against the locking ring 202 so as to prevent axial movements of the retaining ring 301, away from the neck 202, when the closing element 301 is removed from the neck 201.

More in detail, it is the retaining portion 303 of the retaining ring 301 to be provided with the engagement element 313, in such a way as to be retained anchored to the locking ring 202 even when, as illustrated in FIGS. 1A and 1B, the closing element 302 is in the open condition and is locked spaced from the neck 201 and from the dispensing opening 203.

The engagement element 313 is shaped like an annular element which is folded around the free edge 304 towards the inside of the retaining portion 303. More in detail, the annular element may be continuous or interrupted. In effect, there may be a plurality of folded elements, shaped like flaps, which project from the free edge 304 and are folded towards the inside of the retaining portion 303 for making the engagement element.

Alternatively, the engagement element 313 may be shaped like a continuous enlargement or interrupted, not illustrated, which from an inner surface of the retaining portion 303 projects towards the axis Z to engage with the locking ring 202, provided the enlargement does not affect the tab 308.

As mentioned above, the tab can bend about the hinge line 310.

The hinge line 310 is transversal to the axis Z. In effect, the tab 308 comprises a pair of lateral edges 311 which extend between the hinge line 310 and the bottom edge 309, shown in FIGS. 1A and 1B.

The bottom edge 309 is transversal, in particular perpendicular to the axis Z, the lateral edges 311 are transversal to the bottom edge 309. In particular, the lateral edges 311 are parallel to each other, parallel to the axis Z and perpendicular to the bottom edge 309.

In other words, the tab 308 has a preferably rectangular shape wherein the bottom edge 309 is the free edge and, on the opposite side, has the hinge line 310.

However, this condition is not necessary, since a different shape of the tab 308 is possible, which may, for example, have curved lateral edges 311 or inclined relative to the bottom edge 309.

For example, FIG. 14 shows a variant of the cap 1 of FIG. 1, wherein the tab 308 has a trapezoidal shape and has lateral edges 311 which are inclined on opposite sides relative to a centre line of the tab 308. On the other hand, the tab 308 may have a rectangular shape but with rounded corners, that is to say, wherein the lateral edges 311 are curved, as shown in FIG. 15.

On the lateral wall 3 there are two break lines 6, or cut lines, shown in FIGS. 1 and 2, which extend parallel to each other and parallel to the axis Z which define the respective lateral edges 311 of the tab 308.

If the lateral edges 311 of the tab 308 are curved, the cut lines 6 from which it is possible to obtain the lateral edges 311 are also curved.

The cut lines 6 have the same height and have first ends, facing towards the transversal wall 4, between which the hinge line 310 is defined.

As shown in FIG. 1, the hinge line 310 is positioned in the joining portion 305 of the lateral wall 3.

As mentioned, the tab 308 projects relative to the first end zone 305a and to the second end zone 305b of the joining portion 305 and in effect has only an outer part 308a.

FIGS. 2 to 5 show a version of the cap 1 which differs from the version of FIG. 1 in that the tab 308 has, in addition to the outer part 308a, protruding relative to the first end zone 305a and to the second end zone 305b of the joining portion 305, also an inner part 308b, made in the joining portion 305.

The hinge line 310 is positioned, also in this case, on the joining portion 305 of the lateral wall 3 but close to, or aligned with, the first end 501 and the second end 502 of the separation line 5.

The inner part 308b is interposed between the first connecting band 306 and the second connecting band 307 and is separated from the connecting bands 306, 307 by respective stretches of the lateral edges 311.

In this way, the tab 308 has a greater capacity to bend about the hinge line 310 since it has a greater height H.

In effect, in this version of the cap 1, the cut lines 6 extend inside the joining portion 305 to define the inner part 308b of the tab 308.

According to a version not illustrated, in addition to the inner part 308b, the tab 308 comprises an additional part made in the closing element 302 and separated from the latter by respective further stretches of the lateral edges 311. In effect, the hinge line 310 of the tab 308 is positioned in the closing element 302 of the lateral wall 3, since the cut lines 6 extend beyond the joining portion 305, and that is, beyond the retaining ring 301, inside the closing element 302 to define the additional part of the tab 308.

This version of the tab 308 has even greater capacity to bend since the height H of the tab 308, from the hinge line 310 to the bottom edge 309, is increased.

For example, the cut lines 6 might extend up to the knurling lines 312 of the closing element 302 to obtain a hinge line 310 positioned at the knurling lines 312.

It should be noted that for the cap of FIGS. 2 to 5, all the above applies, and in the description which follows, with regard to the cap of FIG. 1 which will not be repeated here for sake of brevity.

The connecting bands 306, 307 are made by means of an incision line 7, shown in FIGS. 1 and 2, which extends between the separation line 5 and the free edge 304 of the retaining ring 301.

The incision line 7 has an angular extension θ, measured about the axis Z, greater than an angular distance (also measured about the axis Z) between the first end 501 and the second end 502 of the separation line 5, that is to say, the angular extension δ of the joining portion 305.

The incision line 7 comprises a first lateral stretch 702 and a second lateral stretch 703 which partly define, respectively, the first connecting band 306 and the second connecting band 307.

More in detail, the first lateral stretch 702 and the second lateral stretch 703 are both perpendicular to the axis Z and are aligned. However, the two lateral stretches 702 and 703 might be slightly inclined relative to each other and have different inclinations, not necessarily parallel to each other.

The first lateral stretch 702 and the second lateral stretch 703 extend, preferably, on a first plane (not illustrated) parallel to a separating plane (not illustrated) containing the separation line 5, the first plane being transversal to the axis Z, in particular perpendicular to the axis Z.

The first lateral stretch 702 and the second lateral stretch 703 respectively define a first free lower edge 306' and a second free lower edge 307' of the connecting bands 306, 307.

In addition, the first lateral stretch 702 and the second lateral stretch 703 also define a first free upper edge 303' and a second free upper edge 303" of the retaining portion 303.

The first lateral stretch 702 and the second lateral stretch 703 are positioned at the distance D2 from the free edge 304 of the retaining ring 301, along an axis parallel to the axis Z, which corresponds to the height of the retaining portion 303.

The distance D2 may be greater than or equal to 1 mm. The distance D2 may be less than or equal to 5 mm. More specifically, the distance D2 may be less than or equal to 4 mm.

In one version, the distance D2 may be between 1 and 3 mm.

In one version, the distance D2 may be equal to 3.9 mm.

The height H1 of the connecting bands 306, 307 may be greater than, or equal to, 1 mm and less than, or equal to, 5.5 mm.

More specifically, the connecting bands 306, 307 may have a height H1 greater than, or equal to, 1.2 mm and less than, or equal to, 4 mm.

In one version, the height H1 may be variable from 1.2 mm to 3.5 mm.

The height H1 may be equal to 2 mm.

In one version, the cap 1 may have a height H2, measured in a direction parallel to the axis Z, variable between 10 and 21 mm.

It should be noted that the connecting bands 306, 307 comprise a first portion adjacent to the separation line 5, and a second portion adjacent to the incision line 7. In the example shown in FIGS. 1 and 2, wherein the separation line 5 and the first lateral stretch 702 and the second lateral stretch 703 of the incision line 7 lie in respective planes parallel to each other, the height H1 of the connecting bands 306, 307 is constant along the entire length of the connecting bands 306, 307 and is equal for the two connecting bands 306, 307.

In effect, as better illustrated in FIGS. 1A and 1n FIGS. 3 and 4, the first connecting band 306 is formed between a first end stretch of the separation line 5 and the first lateral stretch 702 of the incision line 7. The second connecting band 307 is formed between a second end stretch of the separation line 5 and a second lateral stretch 703 of the incision line 7. The first end stretch of the separation line 5 is a stretch which extends up to the first end 501. The second end stretch is a stretch which extends up to the second end 502.

The first lateral stretch 702 and the second lateral stretch 703 extend up to the cut lines 6.

Each lateral stretch 702, 703 of the incision line 7, both the first lateral stretch 702 and the second lateral stretch 703, may have an angular extension β about the axis Z of between 20° and 110°, preferably between 30° and 70°, even more preferably between 50° and 60°. In other words, between the ends of each lateral stretch 702, 703, there is an angular distance β of between 20° and 110°, preferably between 30° and 70°, even more preferably between 50° and 60°.

In one version, each lateral stretch 702, 703 has an angular extension β about the axis Z of between 20° and 90°.

The incision line 7 comprises a central stretch 701 which is interposed between the first lateral stretch 702 and the second lateral stretch 703.

The central stretch 701 extends on a second plane, parallel to the plane of separation and interposed between the first plane and the free edge 304 of the retaining ring 301, and defines the bottom edge 309 of the tab 308.

It should therefore be noted that, advantageously, the connecting bands 306, 307 and the tab 308 are made by means of the separation line 5 and the incision line 7 which lie in three planes parallel to each other, that is to say, the separation line 5 lies in the separation plane, whilst the incision line 7 lies, with regard to the two lateral stretches 702 and 703 in the first plane, and, with regard to the central stretch 701, in the second plane.

The central stretch 701 is positioned at a distance D3 along an axis parallel to the axis Z from the free edge 304 of the retaining ring 301.

The distance D3 may be less than, or equal to, 3 mm. More specifically, the distance D3 may be less than, or equal to, 1 mm.

The cut lines 6 have second ends between which extends the central stretch 701 of the incision line 7.

The distance between the first ends of the cut lines 6 and the central stretch 701 of the incision line 7 defines the height H of the tab 308, along an axis parallel to the axis Z, which corresponds to the distance between the hinge line 310 and the bottom edge 309 of the tab 308.

The central stretch 701, which determines the width of the tab 308, has an angular extension γ about the axis Z of between 10° and 120°, preferably between 15° and 70°, more preferably between 20° and 50°, even more preferably between 30° and 40°, even more preferably equal to 25°. In other words, between the ends of the central stretch 701 there is an angular distance γ of between 10° and 120°, preferably between 15° and 70°, more preferably between 20° and 50°, even more preferably between 30° and 40°, even more preferably equal to 25°.

In one version, the central stretch 701 has an angular extension γ about the axis Z of between 10° and 120°, preferably between 20° and 40°, even more preferably equal to 25°.

Thanks to these angular distances, the tab 308 is sufficiently flexible about the hinge line 310 and the connecting bands 306, 307 are sufficiently long to allow the closing element 302 to be moved axially to move the tab 308 beyond an upper edge of the neck 201, when the cap 1 is opened, and to move the tab 308 to disengage from the locking ring 202, when the cap 1 is closed.

It should be noted that the incision line 7, and that is, the central stretch 701, the first lateral stretch 702 and the second lateral stretch 703, may be preferably shaped like a incision, that is to say, a cut line, passing through the entire thickness of the lateral wall 3, and that is to say, of the retaining ring 301.

This allows the user to define without effort the hinge arrangement comprising the connecting bands 306, 307 and the tab 308 for easily moving away the closing element 302 from the retaining ring 301 during the passage in the open condition.

Alternatively, the incision line 7 may be shaped like a line of weakness not passing through the entire thickness of the lateral wall 3, but at which the thickness of the lateral wall 3 is very reduced relative to the surrounding zones to facilitate the fracture of the incision line 7 in the retaining ring 301.

Alternatively, along the incision line 7 there may also be breakable elements 704, shown in FIGS. 14 and 15, which may be similar and angularly aligned with the breakable bridges 503 or be misaligned relative to them. For example, the breakable bridges 503 may be angularly offset about the axis Z relative to the breakable elements 704.

As regards the cut lines 6, they are preferably shaped like a through incision, which therefore does not need to be broken at the moment of opening the container 2, which extends for the entire thickness S of the lateral wall 3.

The joining portion 305 has an angular extension δ about the axis Z of between 10° and 120°, preferably between 30° and 110°, even more preferably between 20° and 40°. In other words, between the first end 501 and the second end 502 of the separation line 5 there is an angular distance b of between 10° and 120°, preferably between 30° and 110°, even more preferably between 20° and 40°.

In one version, the joining portion 305 has an angular extension δ of between 10° and 120°, preferably between 20° and 40°.

For example, a closing cap 1 could have a joining portion 305 with an angular extension equal to 40°, a tab 308 with an angular extension equal to 25° and the first lateral stretch 702 and the second lateral stretch 703 with an angular extension of between 50° and 60°.

This type of cap 1 has a tab 308 which has an angular extension γ less than the angular extension δ of the joining portion 305 and has wide connecting bands 306, 307.

However, for some particular types of containers 2, having a neck 201 of reduced length and for which it is advantageous to use caps 1 of reduced thickness, the closing cap 1 could have a joining portion 305 with an angular extension δ of between 90° and 120°, a tab 308 of angular extension γ of between 90° and 120° and the first lateral stretch 702 and the second lateral stretch 703 of angular extension β each between 20° and 35°.

In this other type of cap 1, the tab 308 is very wide whilst the two connecting bands 306, 307 are very short.

The joining portion 305 has a centre line which coincides with the centre line of the tab 308. Moreover, the first lateral stretch 702 and the second lateral stretch 703 have an equal angular extension β in such a way that the connecting bands 306, 307 are equal in length and are positioned symmetrically relative to a plane containing the axis Z and the centre line of the joining portion 305.

However, according to a variant not illustrated, the first connecting band 306 may be of different length relative to the second connecting band 307, since the first lateral stretch 702 and the second lateral stretch 703 may have a different angular extension β. According to an even different variant, the centre line of the joining portion 305 may also not coincide with the centre line of the tab 308.

In use, the cap 1 is applied on the neck 201 of the container 2 in the closed condition shown in FIG. 1, or FIG. 2. The cap 1 is positioned in such a way that the engagement element 313 provided inside the retaining ring 301, in particular on the retaining portion 303 is below the locking ring 202 present on the neck 201.

When the user wishes to open the container for the first time, the user grips the closing element 302 and rotates the closing element 302 about the axis Z, in order to unscrew the closing element 302 from the neck 201. Initially, the closing element 302 and the retaining ring 301 are rotated together about the axis Z, and they simultaneously move together in a direction parallel to the axis Z, away from the neck 201.

This occurs until the engagement element 313 of the retaining portion 303 abuts against the locking ring 202 provided on the neck 201. At this point, the locking ring 202 prevents the retaining portion 303 from rising further along the axis Z, acting as a stop for the movement of the retaining portion 303, and therefore of the retaining ring 301, away from the neck 201.

The closing element 302, which is unscrewed by the user, continues to move along the axis Z away from the neck 201. The breakable bridges 503 are thereby tensioned, until causing the failure. The closing element 302 consequently separates from the retaining ring 301 along the separation line 5, but remains joined to the retaining ring 301 at the joining portion 305.

If the user continues to unscrew the closing element 302, so as to move the closing element 302 along the axis Z to remove it from the neck 201, the first connecting band 306 and the second connecting band 307 deform since they extend between the retaining portion 303, locked by the locking ring 202, and the joining portion 305, integral with and joined to the closing element 302, which has moved away from the locking ring 202 and raised upwards. The tab 308, which protrudes relative to the first end zone 305a and to the second end zone 305b of the joining portion 305 also moves away from the locking ring 202 whilst the first connecting band 306 and the second connecting band 307 are pulled upwards.

If present, the breakable elements 704 are thus tensioned until they break. Consequently, the first connecting band 306 and the second connecting band 307 are spaced both from the closing element 302 and from the retaining portion 303 and remain joined to each other in the joining portion 305.

The first connecting band 306 and the second connecting band 307 thus adopt the shape of a trapezium shown in FIG. 4. It may be noted that the tab 308 is positioned centrally, in the smaller base of the trapezium, and projects towards the free edge 304 of the retaining ring 301.

If the first connecting band 306 has the same length as the second connecting band 307, the trapezium is of the isosceles type. If, on the other hand, the connecting bands 306, 307 have a different length, they will adopt a shape of the scalene trapezium type. With regard to the position of the tab 308 in the joining portion 305, the tab 308 can protrude centrally or laterally from the latter.

The first connecting band 306 remains joined to the retaining portion 303 at the outer end of the first lateral stretch 702 of the incision line 7. Similarly, the second connecting band 307 remains joined to the retaining portion 303 at the outer end of the second lateral stretch 703 of the incision line 7, the outer end of the first lateral stretch 702 and the outer end of the second lateral stretch 703 delimiting externally the incision line 7 circumferentially.

If the first connecting band 306 and the second connecting band 307 are arranged in an inclined configuration relative to the retaining portion 303 and converge in the joining portion 305, the tab 308 extends along an axis which is parallel to the axis Z. Continuing to unscrew the closing element 302, the latter is disengaged from the coupling structure, or thread, 204 made on the neck 201, so that the container 2 can be opened. The retaining portion 303 of the retaining ring 301 remains, on the other hand, anchored to the neck 201.

Since the tab 308 protrudes relative to the joining portion 305, in order to be able to completely disengage the tab 308 from the neck 201 of the container 2, the closing element 302 must be further moved away from the neck 201. However, the tab 308 may also bend relative to the hinge line 310 to disengage its bottom edge 309 from the upper edge of the neck 201.

As mentioned above, the joining portion 305 defines a hinge band, which keeps connected the closing element 302 relative to the neck 201 and about which the closing element 302 can rotate away from the neck 201.

Figure 5:
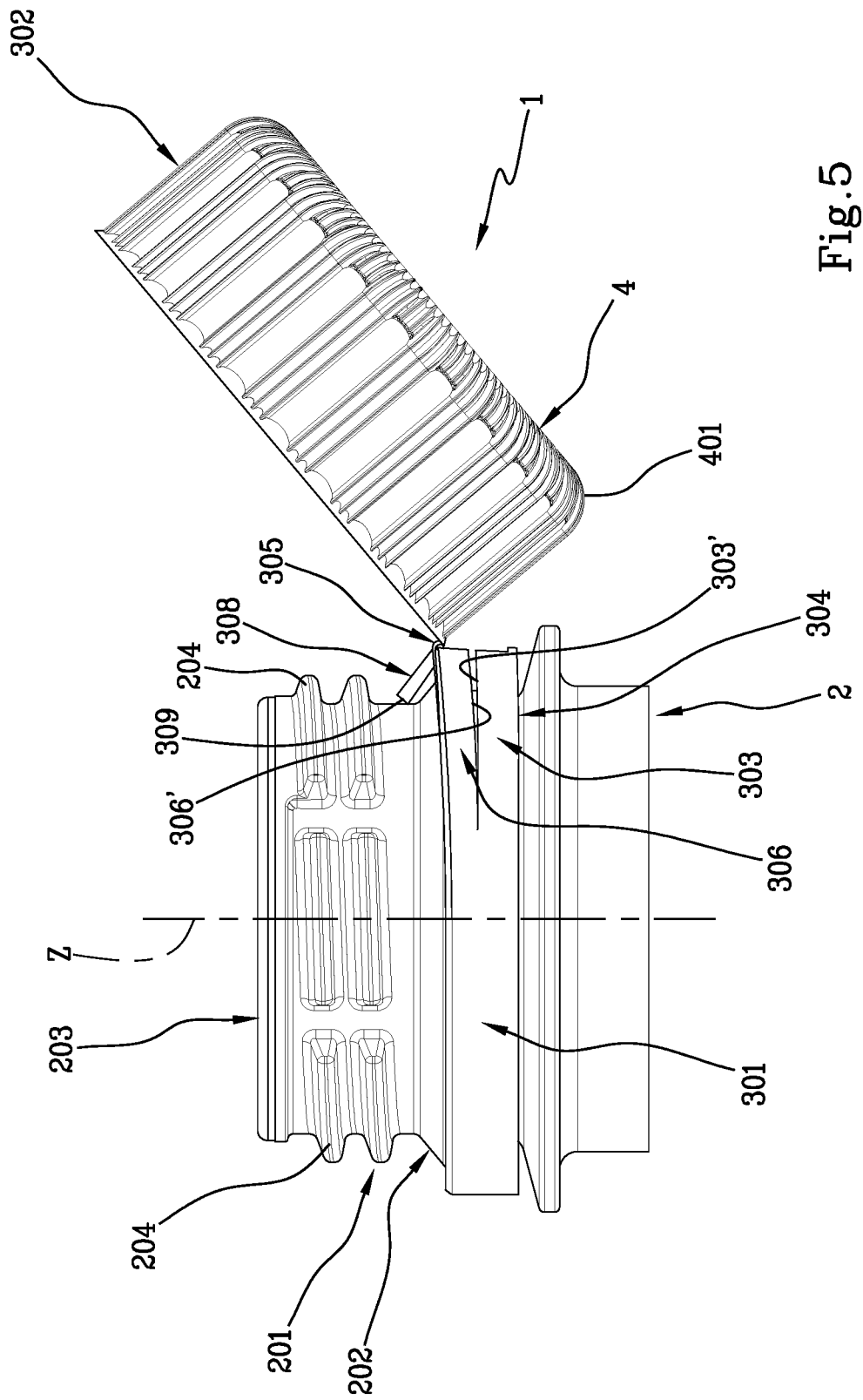
FIG. 5 is the side view of the cap of FIG. 2 in an open configuration, wherein the closing element is spaced from the neck of the container and the tab is locked resting on the neck, close to a locking ring of the neck.
Figure 7:
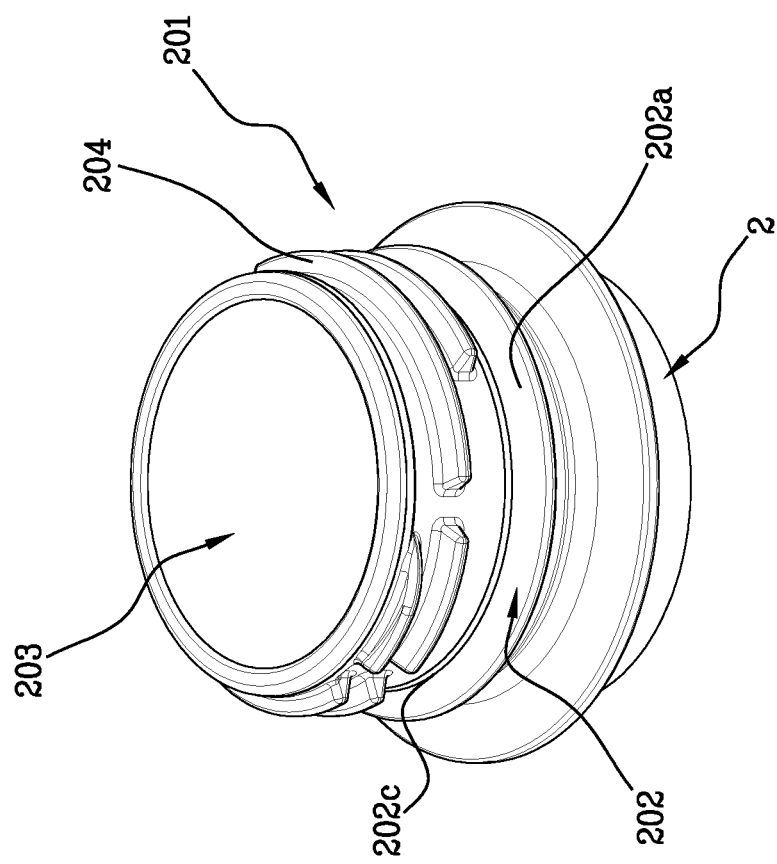
FIG. 7 is a perspective view of the neck of FIG. 6.

By moving the closing element 302 around the joining portion 305, after the closing element 302 and the tab 308 have disengaged from the neck 201, it is possible to move the closing element 302 to a lateral position and spaced from the neck 201, as shown in FIGS. 1A, 1B and in FIG. 5, until locking the tab 308 resting on the neck 201. Since the tab 308 is protruding relative to the first end zone 305a to the second end zone 305b of the joining portion 305, the bottom edge 309 of the tab 308 intercepts the neck 201 of the container 2, as mentioned above.

More in detail, the tab 308 rests in the proximity of the locking ring 202 of the neck 201 since the locking ring 202 prevents the tab 308 from rotating further.

The bottom edge 309 of the tab 308 faces towards the dispensing opening 203 of the container 2 and the tab 308 prevents the closing element 302 from accidentally rotating again towards the neck 201 and about it.

As mentioned above, in the open condition the joining portion 305 defines the hinge band which deforms to allow the rotation of the closing element 302 relative to the neck 201 and the connecting bands 306, 307 comprise the first portion adjacent to the separation line 5, and the second portion adjacent to the incision line 7.

In the open condition shown in FIGS. 1A and 1B which refer to the cap 1 of FIGS. 1, 14 and 15, in which the tab 308 comprises only the outer part 308a, not only the hinge band is deformed, but also the connecting bands 306 and 307.

The first portion widens radially, without undergoing a substantial twisting. The second portion may, on the other hand, be twisted to pass under the first portion, interposing between the first portion and the outer surface of the neck 201. In this way, when the tab 308 is resting on the neck 201 so that the bottom edge 309 of the tab 308 faces towards the dispensing opening 203 of the container 2, the second portion of the connecting bands 306 and 307 is twisted and is below the first portion.

Below are some examples of dimensions which a cap of the type shown in FIG. 1 may have.

EXAMPLE 1

Cap for neck 29/25 mm (that is to say, for a neck having an inside diameter of approximately 25 mm and an outside diameter of approximately 29 mm)

Radial thickness S of the connecting bands: 0.85 mm

Height H1 of connecting bands: 1.2 mm

Ratio between height H1 and radial thickness S of the connecting bands: 1.2/0.85=1.4

EXAMPLE 2

Cap for neck 30/25 mm (that is to say, for a neck having an inside diameter of approximately 25 mm and an outside diameter of approximately 30 mm)

Radial thickness S of the connecting bands: 0.55 mm
Height H1 of connecting bands: 2.8 mm
Ratio between height H1 and radial thickness S of the connecting bands: 2.8/0.55=5.1

EXAMPLE 3

Cap for neck PCO1881
Radial thickness S of the connecting bands: 0.7 mm
Height H1 of connecting bands: 3.5 mm
Ratio between height H1 and radial thickness S of the connecting bands: 3.5/0.7=5 The ratio between the height H1 of the connecting bands and the radial thickness S of the connecting bands 306, 307 may therefore be greater than, or equal to, 1.4.

The above-mentioned ratio may be less than or equal to 5.1.

More generally speaking, the ratio between the height H of the connecting bands and the radial thickness R of the connecting bands may be less than, or equal to, 6.5.

These values ensure that the connecting bands 306, 307 have an optimum torsional rigidity to deform as explained above, by twisting which affects at least a part of the height H1 of each connecting band, and to generate an interference between the neck 201 and the joining portion 305 (and, if necessary, between the neck 201 the connecting bands 306, 307 sufficient to keep the closing element 302 in the open position in a reliable and secure manner. The twisting of the connecting bands 306, 307 together with the resting of the tab 308 on the neck, reinforces the closing element 302 in the open condition.

The numerical values defined above with reference to the cap 1 of FIG. 1 are also applicable to the cap shown in FIGS. 14 and 15.

On the other hand, in the open condition shown in FIG. 5 which refers to the cap of FIG. 2, in which the tab 308 comprises the outer part 308a and the inner part 308b, and the hinge band comprises a first hinge element and a second hinge element defined at least partly, respectively, in the first end zone 305a and in the second end zone 305b of the joining portion 305, the deformation affects exclusively the first hinge element and the second hinge element but not the connecting bands 306, 307, which therefore remain substantially undeformed and do not twist.

The first hinge element and the second hinge element are, respectively, immediately adjacent to the first end 501 and to the second end 502 of the joining portion and are therefore positioned circumferentially on the opposite side.

The closing element 302 remains in the open condition thanks to the presence of the interference between tab 308 and neck 201.

After use, the user can return the cap 1 to the closed condition shown in FIG. 1, and in FIG. 2, by a sequence of operations opposite to that described above.

In order to disengage the tab 308 from the locking ring 202, the user must firstly move the closing element 302 away from the neck 201, deforming the first connecting band 306 and the second connecting band 307, in the same direction of inclination of the upper wall 202a of the locking ring 202, if the tab 308 has rested on the locking ring 202, or between the connecting structure 204 and the locking ring 202.

The particular shape of the hinge arrangement, and that is to say, of the connecting bands 306 and 307, of the joining portion 305 and of the tab 308 is particularly suitable for being deformed in a direction of inclination parallel to the upper wall 202a, so that the user can disengage the tab 308 by sliding it on the upper wall 202a of the locking ring 202 when pulling the closing element 302 away from the container 2. It should be noted, however, that the hinge arrangement according to the invention, including the tab 308, may also be advantageously applied to containers 2 having a locking ring 302 of different shape.

Subsequently, the user can reapply the closing element 302 on the neck 201, rotating the closing element 302 around the joining portion 305 and axially moving the closing element 302 away from the neck 201, before screwing again the closing element 302 on the thread 204.

During the closing of the container 2, the tab 308 is not an obstruction since it is positioned parallel to the outer surface of the neck 201.

Figure 16:
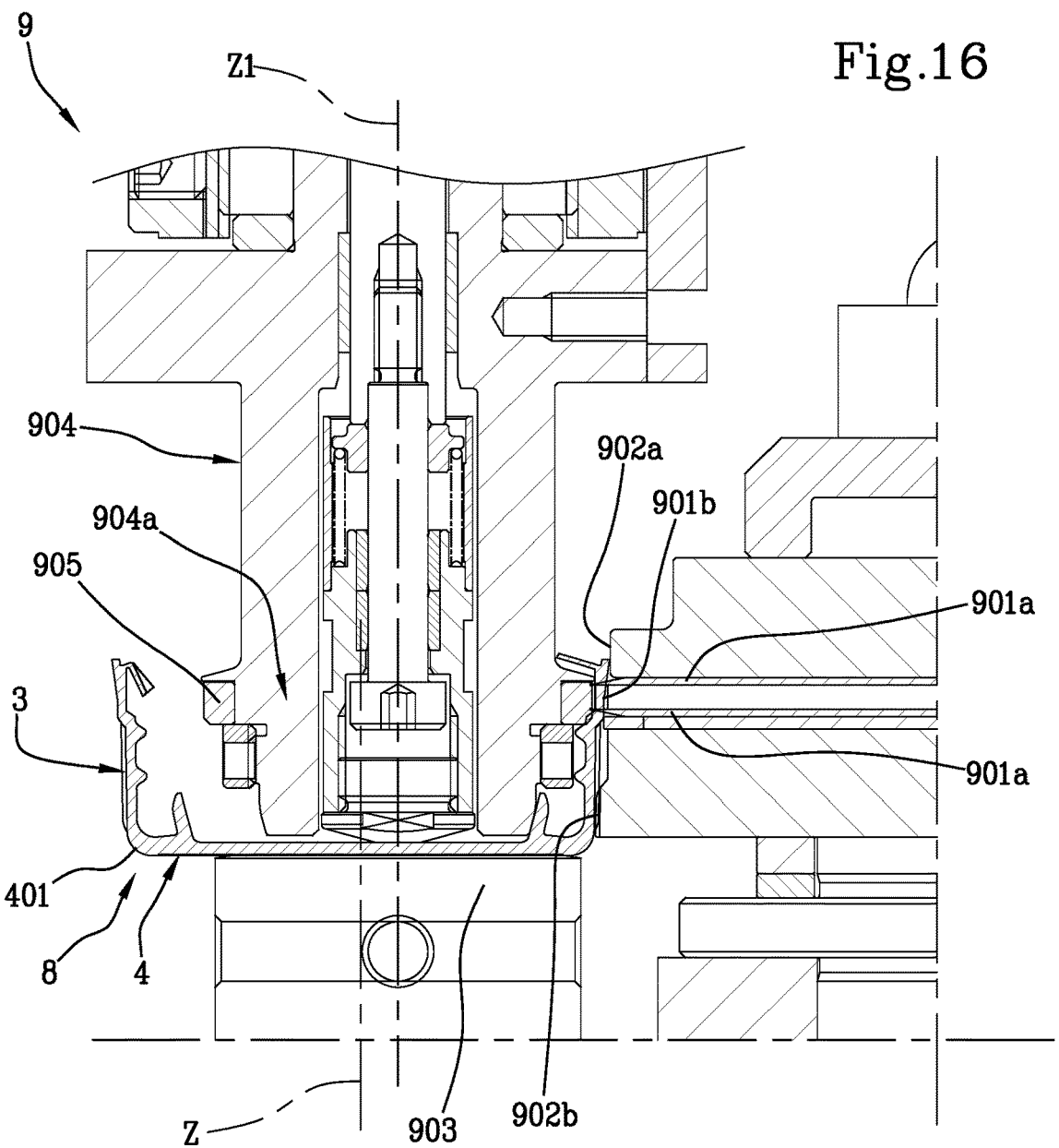
FIG. 16 is a cross section of a cutting unit for making the cap of the preceding drawings having a separation line, an incision line and cut lines.

The cap 1 may be obtained starting from a concave body 8, shown in FIG. 16, which comprises the lateral wall 3 and the transversal wall 4. The concave body 8 may be produced by moulding a polymeric material, for example compression moulding or injection moulding.

After the concave body 8 has been formed, the separation line 5 and the incision line 7 are made on the lateral wall 3.

To make the separation line 5, the incision line 7 and the cut lines 6 in the cap 1, there is a cutting unit 9 comprising cutting tools, which may, for example, be blades 901a positioned perpendicularly to the axis Z, to make the separation line 5 and the incision line 7, or blades 901b positioned parallel to the axis Z to make the cut lines 6.

The cutting unit 9 may be located downstream of a mould in which the concave body 8 has been formed. These cutting operations may be performed by means of respective blades, for example circular or linear, which interact with the lateral wall 3 from the outside of the latter, or from the inside. In particular, the concave body 8 can be rotated about the axis Z of the lateral wall 3, whilst the blades 901a, 901b are kept stationary, so as to bring consecutive zones of the lateral wall 3 to interact, in succession, with the blades 901a and/or 901b.

It is also possible to keep the concave body 8 stationary and to rotate the blades 901a, 901b, to make the cut.

The blades 901a positioned perpendicularly to the axis Z and the blades 901b positioned parallel to the axis Z may cut simultaneously, or alternatively, relative to their position with respect to the lateral wall 3.

FIG. 16 shows the cutting unit 9 which comprises an outer surface, not illustrated, which extends around the concave body 8 and is shaped to surround externally the lateral wall 3 of the concave body 8. The outer surface comprises a first portion 902a configured to support the cutting tools 901, and a second portion 902b configured to allow the rotation of the concave body 8 about its own axis Z.

The first portion 902a and the second portion 902b are configured to superimpose in a direction parallel to the axis Z and the concave body 8 is configured to be placed in rotation in such a way as to be pushed against the first portion 902a and the second portion 902b.

The cutting unit 9 also comprises a planar base 903 on which the concave body 8 rests, and more precisely, the transversal wall 4.

It should be noted that the second portion 902b has a plurality of respective knurling lines (not illustrated), which are complementary to the shape of the plurality of knurling lines 312 of the concave body 8.

In this way, when the concave body 8 is rotated and is pushed against the outer surface, a first portion of the lateral wall 3 is pushed against the first portion 902a and therefore against the cutting tools 901a and/or 901b to obtain the separation line 5 and/or the incision line 7 and/or the cut lines 6 whilst a second portion, close to the connecting zone 401, meshes with shape coupling to the knurling lines of the second portion 902*b*.

The cutting unit 9 comprises a spindle 904 which is smaller in diameter than the concave body 8 and is idly rotatable about its own axis Z1, parallel to the axis Z. A head 904*a* of the spindle 904 is configured to be received in the concave body 8 and comprises a contact ring 905 made of polymeric material fixed in the spindle 904 in a position such as to make contact with the lateral wall 3 of the concave body 8.

The spindle 904, in a manner not illustrated, is fixed to a carousel rotatable about a respective axis which is parallel to the axis Z and Z1.

In use, the head 904*a* of the spindle 904 pushes against the lateral wall 3 of the concave body 8 which is therefore pushed against the first portion 902*a* and the second portion 902*b* of the outer surface 902.

Since the second portion of the lateral wall 3 is meshed by means of the plurality of knurls 312 with the knurls of a conjugate shape of the second portion 902*b*, the motion of the carousel about its axis causes the spindle 904 to rotate and the latter causes the rolling of the concave body 8, and more precisely of the first portion of the lateral wall 3 on the first portion 902*a* of the outer surface 902.

The cutting tools 901, fixed to the first portion 902*a*, intercept the lateral surface 3 and make contact with the ring 905 whilst the lateral wall 3 is kept pushed by the head 904*a* of the spindle 904 against the first portion 902*a*. The contact ring 905 guarantees an effective and precise cut of the lateral wall 3.

The blades which make it possible to obtain the separation line 5 and the incision line 7 may be configured to interact with the lateral wall 3 on respective parallel planes, for example perpendicular to the axis Z, if, as in the examples shown above, it is desired that the separation line 5 and the incision line 7 lie in respective parallel planes. It should be noted that the cutting tools 901*a* are blades parallel to each other which are angularly distributed along the first portion in such a way that during rotation the concave body 8 they intercept in succession the blades to define the separation line 5 and/or the incision line 7.

The blades 901*a* may have an interrupted cutting edge, if it is desired that, along the separation line 5, the breakable bridges 503 remain defined and/or that along the incision line 7 respective breakable elements 704 remain defined.

To make a cap 1 for a container 2 according to the invention, and also the cap 1' which will be described below, a method is provided which comprises the following steps:
  providing a lateral wall 3 of the cap 1 extending around an axis Z and a transversal wall 4 positioned at one end of the lateral wall 3;
  cutting a separation line 5 on the lateral wall 3 which extends around the axis Z to define:
  a retaining ring 301, configured for anchoring the retaining ring 301 to the neck 201 and extending up to a bottom edge 304;
  a closing element 302 removably engageable with the neck 201, so as to open or close the container 2;
  wherein the step of cutting the separation line 5 comprises interrupting the cut between a first end 501 and a second end 502, to leave joined the retaining ring 301 and the closing element 302.

The method also comprises the step of:
  joining the retaining ring 301 and the closing element 302 by means of a joining portion 305;
  defining the retaining ring 301 a first connecting band 306 and a second connecting band 307, which extend from the joining portion 305,
  interposing a tab 308 between the connecting bands 306, 307, in such a way that when the container 2 is open and the connecting bands keep the closing element 302 connected to the retaining ring 301, the tab 308 can rest on the neck 201.

For the cap 1 of FIGS. 1 to 11 there is also the step of defining in the retaining ring 301 a retaining portion 303, which is configured to engage internally with a locking ring 202 of the neck 201 and extends up to a free edge 304 of the retaining ring 301, the first connecting band 306 extending from a first end zone 305*a* of the joining portion 305 to the retaining portion 303, and a second connecting band 307, extending from a second end zone 305*b* of the joining portion 305 to the retaining portion 303.

The method comprises the step of providing a first end zone 305*a* of the joining portion 305, from which extends the first connecting band 306 to the retaining portion 303, a second end zone 305*b* of the joining portion 305, from which extends the second connecting band 307 to the retaining portion 303, the second end zone 305*b* being positioned circumferentially on the opposite side relative to the first end zone 305*a*. The method comprises the step of making an incision line 7, which extends between the separation line 5, and the free edge 304, which comprises the step of making a first lateral stretch 702 and a second lateral stretch 703 of the incision line 7, transversally to the axis Z in a first plane parallel to a plane of separation containing the separation line 5.

In this way, a first free lower edge 306' of the first connecting band 306 may be defined, a second free lower edge 307' of the second connecting band 307, a first free upper edge 303' and a second free upper edge 303''' of the retaining portion 303.

The method also comprises the step of making a central stretch 701 of the incision line 7, interposed between the first lateral stretch 702 and the second lateral stretch 703 in a second plane parallel to the separating plane and interposed between the first separating plane and the free edge 304 of the retaining ring 301.

In this way, a bottom edge 309 of the tab 308 may be defined.

To make the first lateral stretch 702, the second lateral stretch 703 and the central stretch 701 of the incision line 7, the method comprises the step of using cutting tools 901*a* positioned transversally to the axis Z.

The method comprises the step of making the separation line 5 and the incision line 7 on three planes which are separate from each other.

If, during production of the cap 1, the axis Z of the cap is positioned vertically, then advantageously the incision line 7 may be obtained with horizontal cutting tools 901*a*, after the cap 1 has been made, that is to say, with horizontal blades.

To obtain the lateral edges 311 of the tab 308, there is the step of making two cut lines 6 parallel to the axis Z and parallel to each other using cutting tools 901*b* positioned parallel to the axis Z.

The method comprises the step of cutting the separation line 5 and the incision line 7 using cutting tools which have a cutting edge interrupted to define, respectively, a plurality of breakable bridges 503 along the separation line 5 and optionally to define a plurality of breakable elements 704 along the incision line 7 or comprises the step of cutting the separation line 5 and the incision line 7 using cutting tools having a flat cutting edge.

If the axis Z is positioned vertically, then the cut lines 6 can be obtained with vertical cutting tools 901*b* and that is to say, vertical blades can be used after the cap 1 has been made.

The horizontal blades may be used in a first cutting station, not illustrated, and the vertical blades in a second cutting station, not illustrated, that is to say, to cut horizontally and vertically in succession the cap 1 grouping together the cutting tools 901*a* transversal to the axis Z and the cutting tools 901*b* parallel to the axis Z.

The cutting tools 901*a* may also be suitably positioned transversally to the axis Z and/or the cutting tools 901*b* positioned parallel to the axis Z in such a way as to make angularly in succession the separation line 5, the incision line 7 and the cut lines 6. For example, it is possible to make in succession the first lateral stretch 702 of the incision line 7, a first cut line 6 of the cut lines, the central stretch 701 of the incision line 7, a second cut line 6 and, lastly, the second lateral stretch 703 of the incision line 7 placing a horizontal blade for making the separation line 5 superimposed on a plurality of horizontal blades for making the incision line 7.

It should be noted, therefore, that in order to make the cap 1 according to the invention, traditional moulds can be used since the separation line 5, the incision line 7 and the cut lines 6 can be made as cut lines by means of a cutting operation in a simple and inexpensive manner on the cap 1, shaped as a concave body, after the latter has been formed.

The method according to the invention therefore comprises forming a concave body 8 which comprises a lateral wall 3 extending about an axis Z and a transversal wall 4 positioned at one end of the lateral wall 3 and cutting by means of cutting tools 901*a*, preferably from the outside of the concave body 8, or optionally from the inside, the separation line 5 and the incision line 7 in the lateral wall 3, rotating the concave body 8 and keeping the cutting tools stationary or optionally keeping the concave body 8 stationary and rotating the cutting tools 901*a* about it.

The method also comprises pushing the concave body 8 using a spindle 904 provided with a contact ring 905 made of polymeric material in such a way that a first portion of the lateral wall 3 pushes against a first portion 902*a* of an outer surface provided with cutting tools 901*a* and/or 901*b* and that a second portion of the lateral wall 3, provided with knurls 312, engages the knurls present in a second portion 902*b* of the outer surface, shaped complementary to the knurls 312 of the lateral wall 3.

The method also comprises rotating the spindle 904 in such a way that the concave body 8 rolls on the first portion 902*a* of the outer surface drawn by the meshing between the second portion of the lateral wall 3 on the second portion 902*b* of the outer surface.

With reference to FIGS. 8 to 11, there is a possible combination of the cap 1 and the neck 201 of the container 2, in accordance with the third aspect of the invention. This version of the cap 1 differs from the cap 1 of FIG. 2 only in that it has a locking ring 301', formed on the lateral wall 3 by a separation line 5', in which there are connecting bands 306, 307, which are made by means of an incision line 7', which comprises a first lateral stretch 702' and a second lateral stretch 703' which respectively define the first free lower edge 306' and the second free lower edge 307' of the first connecting band 306 and of the second connecting band 307, wherein the first lateral stretch 702' and the second lateral stretch 703' are suitably positioned.

For this version, too, the first connecting band 306 and the second connecting band 307 also extend from the joining portion 305 to the retaining portion 303 and the tab 308 is circumferentially interposed between the first connecting band 306 and the second connecting band 307 and projects towards the free edge 304.

As mentioned, the locking ring 202 projects from an outer surface of the neck 201, has an upper wall 202*a* facing towards the dispensing opening 203, having a truncated cone shape, and a base wall 202*b* facing towards a bottom of the container 2. In other words, the locking ring 202 extends in a direction parallel to the axis Z between an upper end 202*c*, closest to the dispensing opening 203 of the neck 201 and a lower end, positioned on the opposite side to the dispensing opening 203, which coincides in the case shown with the base wall 202*b*. It should be noted, however, that if the locking ring 202 has shapes different to the truncated cone shape, the lower end may not coincide with the base wall 202*b*.

According to this variant, advantageously, when the cap 1 and the neck 201 are in combination with each other, in the sense that the cap 1 is applied on the neck 201, the first lateral stretch 702' and the second lateral stretch 703' of the incision line 7' are positioned beyond the lower end 202*b* of the locking ring 202, towards the dispensing opening 203, if we consider a direction parallel to the axis Z, or at the lower end, when the closing element 302 is in a closed condition.

More in detail, if we consider the axis Z and a plane perpendicular to it which passes through the lower end 202*b* of the locking ring 202, the first lateral stretch 702' and the second lateral stretch 703' lie on this plane or in the half-space facing towards the dispensing opening 203.

In this way, when the closing element 302 is in an open condition and the connecting bands 306, 307 keep the closing element 302 connected to the retaining ring 301', the tab 308 can rest on the neck 201 beyond the upper end of the locking ring towards the dispensing opening 203.

In effect, as mentioned above, the tab 308 may be supported to rest, for example, in the outer zone of the neck 201 between the locking ring 202 and a lower thread of the coupling structure 204, or precisely on the coupling structure 204 in relation to the shape of the retaining ring 301, 301' and/or of the locking ring 202 and/or of the tab 308.

It should be noted that in this version of the cap 1 of FIGS. 8 to 11, in relation to the distance D2 of the first stretch 701' and of the second stretch 702' of the incision line 7' with respect to the free edge 304 of the retaining ring 301' and to the positioning of the locking ring 202 in the neck 201, in the combination between the cap 1 and the neck 201, the tab 308 may be moved to rest, for example, beyond the upper end 202*c* of the locking ring 202, for example between the upper end 202*c* and a thread of the coupling structure 204 or precisely on the coupling structure 204.

It should also be noted that, in this version of the cap 1, the retaining ring 301' differs from those described above in that it has a height D1 greater than those shown in FIGS. 1 to 7, in a direction parallel to the axis Z.

In effect, the separation line 5' is positioned, when the closing element 302 is in a closed condition, beyond the upper end 202*c* of the locking ring 202 in a direction parallel to the axis Z towards the dispensing opening 203, or at the upper end 202*c*. More in detail, if we consider the axis Z and a plane perpendicular to it which passes through the upper end 202*c* of the locking ring 202, the separation line 5' lies on this plane or in the half-space facing towards the dispensing opening 203.

More in detail, if the separation line 5' is positioned between the upper end 202*c* of the locking ring 202 and a lower thread of the coupling structure 204 of the neck 201, in a direction parallel to the axis Z, the tab 308 can rest on the coupling structure 204 when the closing element 302 is in the open condition.

At the same time, if the retaining ring 301' has a larger dimension D1 and the first stretch 701' and 702' are positioned beyond the lower end 202b of the retaining ring 301', the height H1 of the connecting bands 306, 307 may be maintained equal to that of the cap of FIGS. 1 to 7, with consequent robustness of the connecting bands 306, 307.

The same considerations made for the cap of FIGS. 1 to 7, which will not be repeated for sake of brevity, apply without limiting the scope of the invention for the cap 1 of FIGS. 8 to 11.

The variant embodiments described of the tab 308 with reference to the trapezoidal shape of the tab, or to the rounded corners, shown in FIGS. 14 and 15 also apply for the cap of FIGS. 8 to 11.

The operation, in use, of the cap of FIGS. 8 to 11 is also similar to that of FIGS. 1 to 7, which will not be repeated here for sake of brevity.

It should also be noted that, for this version of cap 1, the same angular dimensions of the joining portion 305, the connecting bands 306, 307 and the tab 308 given previously for the cap 1 of FIGS. 1 to 7 apply, which will not be repeated here for sake of brevity.

The same considerations made for the heights H, H1 and H2, as well as for the distances D1 and D2 also apply.

More specifically, the same considerations made for the cap of FIG. 5 apply for the cap of FIGS. 8 to 11 since, as the tab comprises the outer part 308a and the inner part 308b, the hinge band comprises a first hinge element and a second hinge element defined at least partly, respectively, in the first end zone 305a and in the second end zone 305b of the joining portion 305 and the deformation affects exclusively the first hinge element and the second hinge element but not the connecting bands 306, 307, which therefore remain substantially undeformed and do not twist.

Figure 11:
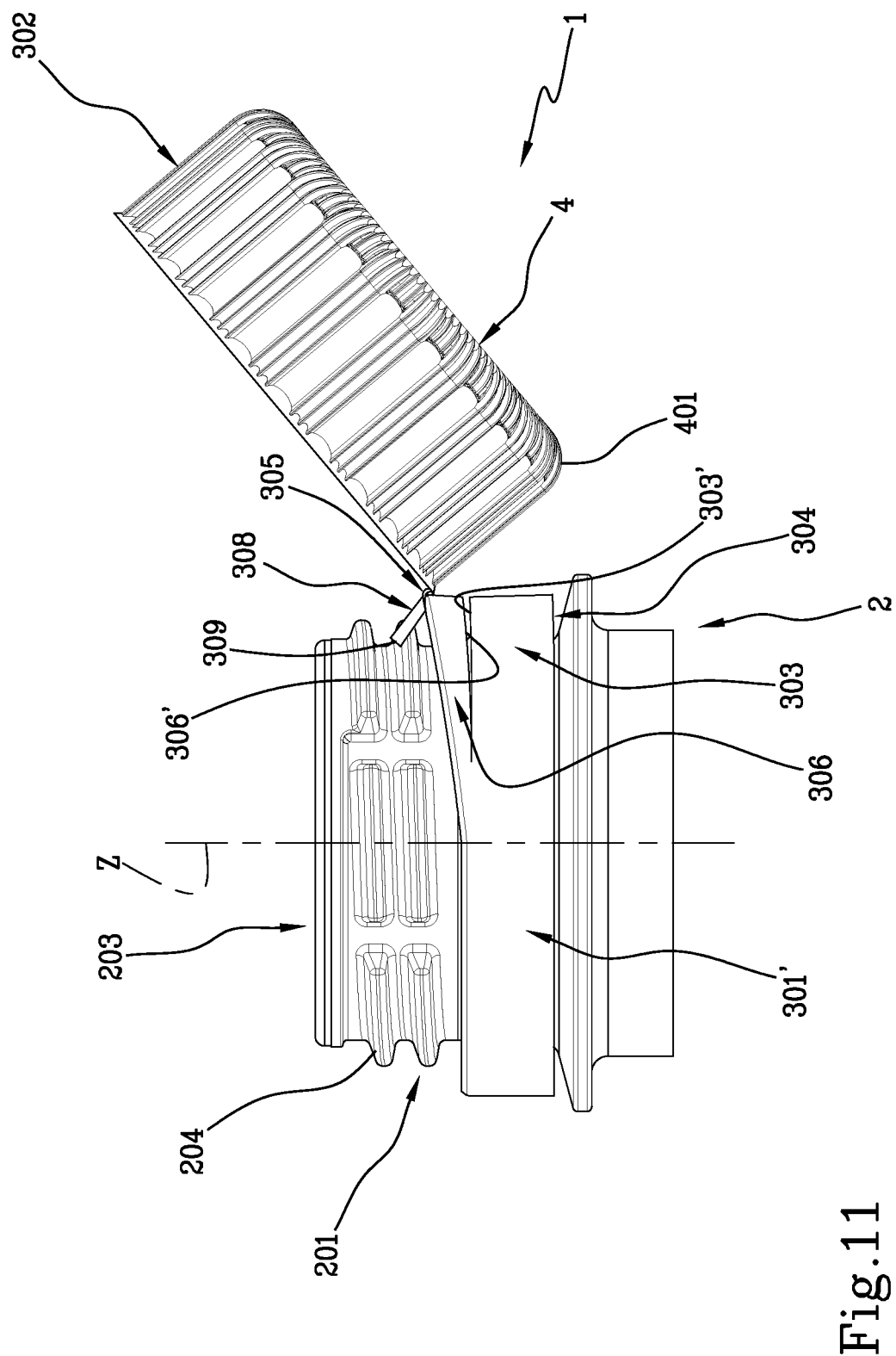
FIG. 11 is the side view of the cap of FIG. 8 in an open configuration, wherein the closing element is spaced from the neck of the container and the tab is locked resting on the neck, close to a locking ring of the neck.

On the other hand, however, by moving the closing element 302 around the joining portion 305, after the closing element 302 and the tab 308 have disengaged from the neck 201, it is possible to move the closing element 302 to a lateral position and spaced from the neck 201, as shown in FIG. 11, until locking the tab 308 resting on the neck 201, and more specifically on the coupling structure 204.

The method for making the cap of FIGS. 8 to 11 is also similar to that described with reference to FIGS. 1 to 7 and FIG. 16, which will, however, be performed by cutting the separation line 5' and the incision line 7', that is to say, the first central stretch 701', the first lateral stretch 702' and the second lateral stretch 703' of the incision line 7 respectively at suitable distances D1, D2 and D3.

Figure 13:
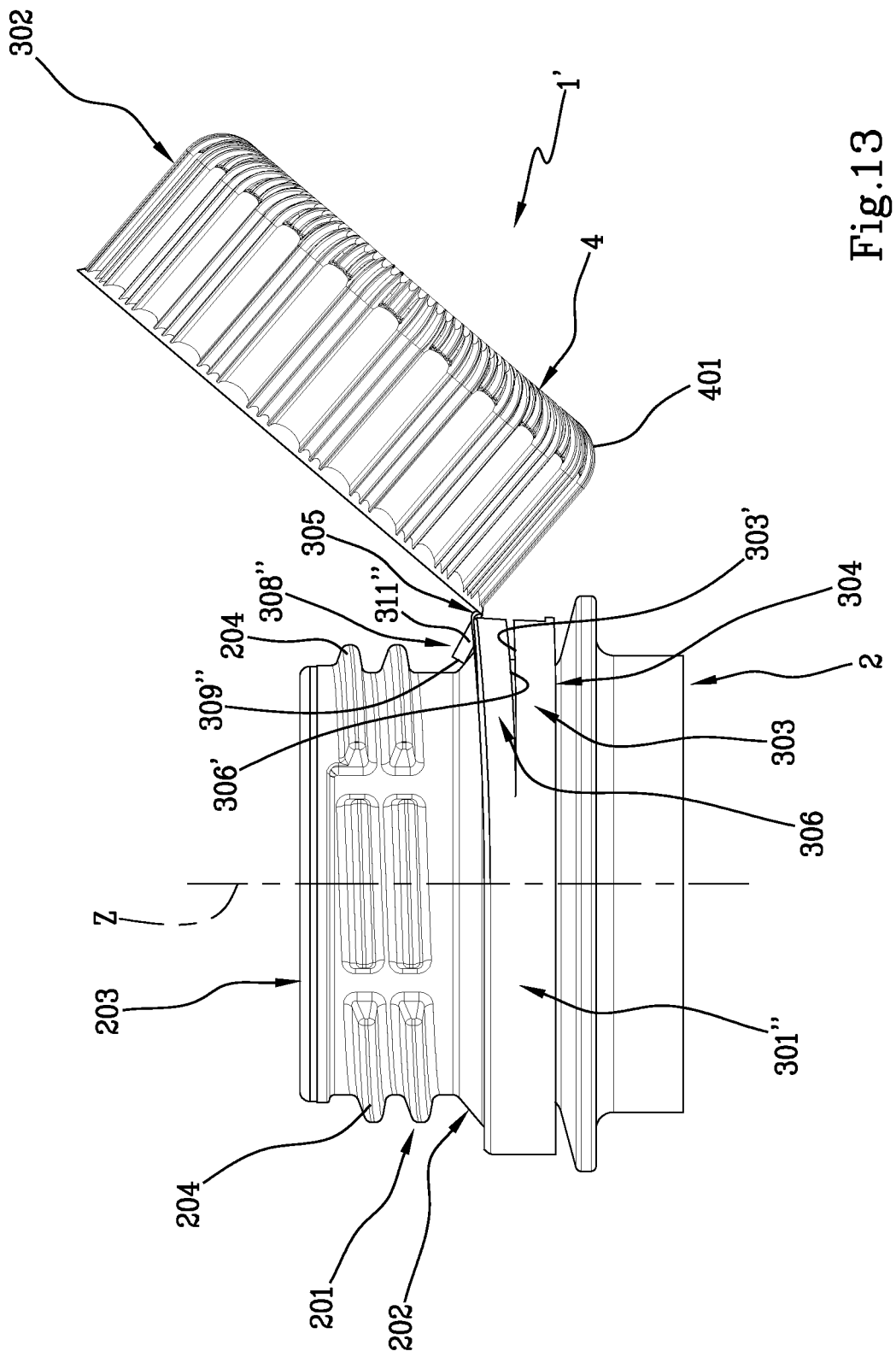
FIG. 13 is a side view of the cap of FIG. 12 in the open configuration, wherein the closing element is spaced from the neck of the container and the tab is locked resting on the neck, close to a locking ring of the neck.

FIGS. 12 and 13 show a version of the cap 1' according to the second aspect of the invention. The cap 1' differs from the cap 1 of FIGS. 2 to 11 in that it has a retaining ring 301", defined on the lateral wall 3 by a separation line 5", in which there are two connecting bands 306, 307 and a tab 308", interposed between the first connecting band 306 and the second connecting band 307, so that when the closing element 302 is in an open condition and the connecting bands 306, 307 keep the closing element 302 connected to the retaining ring 301", the tab 308" can rest on the neck 201. The first connecting band 306 extends from a first end zone 305a of the joining portion 305, the second connecting band 307 extends from a second end zone 305b of the joining portion 305, the second end zone 305a being positioned circumferentially on the opposite side to the first end zone 305b.

In accordance with what was stated above and which will not be repeated here for the sake of brevity, the abovementioned definitions for the components of the cap 1 and 2, for example for the hinge line 310, apply here also for the cap 1'.

According to this version, the tab 308" comprises the lateral edges 311" and a bottom edge 309", wherein the bottom edge 309" is aligned with the first free lower edge 306' and the second free lower edge 307' of the first connecting band 306 and of the second connecting band 307, when the cap is in the closed condition.

In effect, advantageously, on the lateral wall 3 there is an incision line 7" which extends between the separation line 5" and the free edge 304 of the retaining ring 301", which defines the bottom edge 309" of the tab 308", the first free lower edge 306' of the first connecting band 306 and the second free lower edge 307' of the second connecting band 307 and is made by means of a cut line of the lateral wall 3.

Considering the incision line 7", it comprises a central stretch 701" which is interposed between a first lateral stretch 702" and a second lateral stretch 703'" but it may be noted that according to this aspect of the invention the central stretch 701" as well as the two lateral stretches 702'" and 703" are positioned on a single plane positioned transversally, in particular perpendicularly, to the axis Z.

In other words, the tab 308" has a height H which corresponds to the height H1 of the connecting bands 306 and 307 and, that is, the tab 308" is made with only the inner part 308b".

The central unit 701", the first lateral stretch 702" and the second lateral stretch 703' are continuous with each other, and also aligned, if they lie in the same plane. Other shapes of the incision line 7" may be possible, not illustrated, for example a convex or "V" shape with inclined lateral stretches 702" and 703", wherein the central stretch 701" is closer to the free edge 304 relative to the lateral stretches 702", 703". Also for this version, along the separation line 5" there is a plurality of breakable bridges 503, whilst along the incision line 7" there may be a plurality of breakable elements 704, wherein the breakable bridges 503 and the breakable elements 704 are designed to break the first time the cap 1 is opened, the breakable elements 704 can be positioned in angularly offset positions about the axis Z relative to the breakable bridges 503.

However, it should be noted that, preferably, breakable bridges 503 are provided along the separation line 5" but that the incision line 7" may preferably be made by means of a cutting line passing through the entire thickness S of the lateral wall 3.

There are also two cut lines 6" on the lateral wall 3 which define the respective lateral edges 311" of the tab 308" and are made by cutting lines passing through the entire thickness S of the lateral wall 3.

The central stretch 701" of the incision line is positioned between the cut lines 6". If the incision line 7" is convex, for example, the central stretch 701" of it between the cut lines 6" may comprise the vertex of the convex line whilst the first lateral stretch 702" and the second lateral stretch 703" may be, for example, inclined at opposite angles relative to the middle line of the tab 308".

Thanks to this version, the connecting bands 306, 307 and the tab 308" are made with the separation line 5" and the incision line 7" which are simplified relative to the version of caps described above.

In effect, if the incision line 7" lies on a plane positioned transversally, for example perpendicularly, to said axis Z, in the closed condition of the closing element 302, and is parallel to the plane in which the separation line 5'' lies, the separation line 5'' and the incision line 7'' are positioned only on two planes parallel to each other, thus simplifying the making of the cap 1'.

Even though the incision line 7'' is convex, the making of the cap 1' is simplified, for example requiring circular cutting tools suitably positioned on the first portion 902*a* of the outer surface.

For this version of the cap 1', the same angular dimensions apply as for the joining portion 305, the connecting bands 306, 307 and the tab 308 given previously for the cap 1 which will not be repeated here for sake of brevity.

In one version, the incision line 7'' has an angular extension θ measured about the axis Z, greater than, or equal to, 120° and less than, or equal to, 250°, the angular extension θ being preferably greater than, or equal to, 130° and less than or equal to 200°

The same considerations made for the heights H1 and H2, as well as for the distances D1 and D2 also apply.

The height H of the tab may be less than, or equal to, the height H1 of the connecting bands, if the incision line 7'' lies in a plane parallel to the plane in which the separation line 5'' lies, in relation to the height of the lateral walls 311''' given between the hinge line 310 and the bottom edge 309''' of the tab 308'', that is, of the cut lines 6''. In the case, on the other hand, of the tab 308'' made from a convex incision line, the height H of the tab 308'' will be angularly variable relative to the vertex of the central stretch 701''.

For the cap 1' of FIGS. 12 and 13 the same considerations made above for the cap of FIGS. 1 to 11 apply, without restricting the scope of the invention, which will not be repeated for sake of brevity.

The operation, in use, of the cap 1' of FIGS. 12 and 13 is also similar to that of FIGS. 2 to 11, which will not be repeated here for sake of brevity.

More specifically, for the cap 1' of FIGS. 12 and 13 the same considerations made for the cap 1 of FIG. 5 apply, as regards the open condition.

Since the tab 308'' comprises exclusively the inner part 308*b''*, the hinge band comprises a first hinge element and a second hinge element defined at least partly respectively in the first end zone 305*a* and in the second end zone 305*b* of the joining portion 305 and the deformation affects only the first hinge element and the second hinge element but not the connecting bands 306, 307, which therefore remain substantially undeformed and do not twist in the open condition, as illustrated in FIG. 13.

By moving the closing element 302 around the joining portion 305, after the closing element 302 and the tab 308'' have disengaged from the neck 201, it is possible to move the closing element 302 to a lateral position and spaced from the neck 201, as shown in FIG. 13, until locking the tab 308'' resting on the neck 201, and more specifically on the locking ring 212.

The method for making the cap 1' of FIGS. 12 and 13 is also similar to that described for the cap 1 with reference to FIGS. 1 to 11, except that the step of cutting the incision line 7'' comprises the step of cutting the central stretch 701'', the first lateral stretch 702''' and the second lateral stretch 703''' in such a way that they are continuous, and also aligned, if they lie on the same plane.

The caps 1, 1' described above are made of plastic material, for example polypropylene (PP) or polyethylene (PE).

If PE is used, its density may range from low density to high density. More specifically, it is possible to use high-density polyethylene (HDPE).

The high-density polyethylene (HDPE) used to produce the caps described above can have the following properties:
density variable between 950 and 968 kg/m3;
melt index variable from 0.3 to 20 g, under the following measurement conditions: 10 minutes, 190° C., 2.16 kg;
large, or narrow, or unimodal, or multi-modal distribution of molecular weight.

If PP is used, the material may be in the form of a homopolymer, or heterophasic copolymer, or statistical copolymer.

The fluidity index of the PP may vary from 2 to 20 g, under the following measurement conditions: 10 minutes, 230° C., 2.16 kg.

The invention claimed is:

1. A closing cap (1') for a container (2), comprising a lateral wall (3) extending around an axis (Z) and a transversal wall (4) positioned at one end of the lateral wall (3), a separation line (5'') being provided on the lateral wall (3) to define:
a retaining ring (301''), which is configured to remain anchored to a neck (201) of the container (2) and extends up to a free edge (304); a closing element (302) removably engageable with the neck (201), so as to open or close the container (2); the separation line (5'') extending around the axis (Z) and being circumferentially interrupted to leave the retaining ring (301'') and the closing element (302) joined; wherein the retaining ring (301'') comprises:
 a joining portion (305) at which the retaining ring (301'') is joined to the closing element (302);
 a first connecting band (306), which extends from a first end zone (305*a*) of the joining portion (305), and a second connecting band (307), which extends from a second end zone (305*b*) of the joining portion (305), the second end zone (305*b*) being positioned circumferentially on the opposite side to the first end zone (305*a*);
 a tab (308''), interposed between the first connecting band (306) and the second connecting band (307) so that, when the closing element (302) is in an open condition and the first and second connecting bands (306, 307) keep the closing element (302) connected to the retaining ring (301''), the tab (308'') rests on the neck (201); wherein the tab (308'') comprises a pair of lateral edges (311'') and a bottom edge (309''), the bottom edge (309'') being aligned, when the closing element (302) is in a closed condition, with a first free lower edge (306') of the first connecting band (306) and with a second free lower edge (307') of the second connecting band (307);
wherein, when the closing element (302) is in the closed condition, the bottom edge (309''), the first free lower edge (306') and the second free lower edge (307') together define, and lie in, a single plane extending transversely to said axis (Z); and wherein on the lateral wall (3) there are
 an incision line (7'') which extends between the separation line (5'') and the free edge (304) of the retaining ring (301''), defines the bottom edge (309'') of the tab (308''), the first free lower edge (306') of the first connecting band (306) and the second free lower edge (307') of the second connecting band (307) and is made of a break line of the lateral wall (3);
 two cut lines (6'') which define the respective lateral edges (311) of the tab (308'') and are made by cut lines passing through an entire thickness (S) of the lateral wall (3), said two cut lines (6'') not extending below said single plane extending transversely to said axis (Z).

2. The cap according to claim 1, wherein the height (H1) of the first and second connecting bands (306, 307) or the height (H) of the tab (308") is greater than, or equal to, 1 mm and is less than, or equal to, 5.5 mm.

3. The cap according to claim 2, wherein the height (H1) is greater than, or equal to, 1.2 mm and less than, or equal to, 4 mm.

4. The cap according to claim 1, wherein the radial thickness (S) of the first and second connecting bands (306; 307) is greater than or equal to 0.35 mm and is less than or equal to 1.8 mm.

5. The cap according to claim 4, wherein the radial thickness (S) of the first and second connecting bands (306; 307) is greater than, or equal to, 0.5 mm and less than, or equal to, 1.2 mm.

6. The cap according to claim 1, wherein along the separation line (5") there is a plurality of breakable bridges (503), wherein along the incision line (7") there is a plurality of breakable elements (704).

7. The cap according to claim 1, wherein the incision line (7") lies on a plane positioned transversally to said axis (Z), in the closed condition of the closing element (302) and is parallel to the plane in which the separation line (5") lies.

8. The cap according to claim 7, wherein the incision line (7") lies on a plane positioned perpendicular to said axis.

9. The cap according to claim 1, wherein the tab (308") has an angular extension (γ) about the axis (Z) of between 10° and 120°.

10. The cap according to claim 9, wherein the tab (308") has an angular extension (γ) about the axis (Z) of between 15° and 70°.

11. The cap according to claim 9, wherein the tab (308") has an angular extension (γ) about the axis (Z) of between 20° and 50°.

12. The cap according to claim 9, wherein the tab (308") has an angular extension (γ) about the axis (Z) of between 30° and 40°.

13. The cap according to claim 9, wherein the tab (308") has an angular extension (γ) about the axis (Z) equal to 25°.

14. The cap according to claim 1, wherein the incision line (7") has an angular extension (θ) measured about the axis (Z), greater than, or equal to, 120° and less than, or equal to, 250°.

15. The cap according to claim 14, wherein the incision line (7") has an angular extension (θ) measured about the axis (Z), greater than, or equal to, 130° and less than or equal to 200°.

16. The cap according to claim 1, wherein the separation line (5") is positioned at a distance (D1) from the free edge (304) of the retaining ring (301) which is greater than, or equal to, 2 mm and less than or equal to, 6.5 mm.

17. The cap according to claim 16, wherein the separation line (5") is positioned at a distance (D1) from the free edge (304) of the retaining ring (301) which is greater than, or equal to, 3 mm and less than, or equal to, 5 mm.

18. The cap according to claim 1, wherein the incision line (7") is positioned at a distance (D2) from the free edge (304) of the retaining ring (5") which is greater than, or equal to, 1 mm and less than or equal to, 5 mm.

19. The cap according to claim 18, wherein the incision line (7") is positioned at a distance (D2) from the free edge (304) of the retaining ring (5") which is less than, or equal to, 4 mm.

20. The cap according to claim 1, wherein when the closing element (302) is in an open condition and the first and second connecting bands (306, 307) keep the closing element (302) connected to the retaining ring (301"), the joining portion (305) defines a hinge band about which the closing element (302) rotates relative to the neck (201), deforming.

21. The cap according to claim 20, wherein the hinge band comprises a first hinge element and a second hinge element defined at least partly respectively in the first end zone (305a) and in the second end zone (305b) of the joining portion (305), the deformation affecting exclusively the first hinge element and the second hinge element but not the first and second connecting bands (306, 307).

22. The cap according to claim 1, wherein the tab (308") is connected to the lateral wall (3) by a hinge band which is transversal to the axis (Z), wherein each of the first and second connecting bands (306, 307) has a first or top portion and a second or bottom portion, wherein the closing element (302) is rotatable about the hinge band from the closed condition to the open condition without the second portion of each of the connecting bands (306, 307) twisting to pass under the respective first portion and be interposed between the first portion and the outer surface of the neck (201) when the tab (308") is resting on the neck (201) and the bottom edge (309") of the tab (308") faces towards the dispensing opening (203) of the container (2).

\* \* \* \* \*